(12) United States Patent
Suni

(10) Patent No.: US 7,149,185 B1
(45) Date of Patent: Dec. 12, 2006

(54) MEASUREMENT-BASED CONNECTION ADMISSION CONTROL (MBAC) DEVICE FOR A PACKET DATA NETWORK

(75) Inventor: Mikko Suni, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/018,266

(22) PCT Filed: Jun. 18, 1999

(86) PCT No.: PCT/EP99/04238

§ 371 (c)(1),
(2), (4) Date: Feb. 4, 2002

(87) PCT Pub. No.: WO00/79829

PCT Pub. Date: Dec. 28, 2000

(51) Int. Cl.
*H04J 1/16* (2006.01)
(52) U.S. Cl. ........................ 370/230; 370/235; 370/252
(58) Field of Classification Search ........ 370/230–236, 370/252, 465
See application file for complete search history.

(56) References Cited

U.S. PATENT DOCUMENTS

| | | | | |
|---|---|---|---|---|
| 5,119,367 A | * | 6/1992 | Kawakatsu et al. | 370/232 |
| 5,317,570 A | * | 5/1994 | Ochiai | 370/234 |
| 5,583,857 A | * | 12/1996 | Soumiya et al. | 370/233 |
| 5,805,577 A | * | 9/1998 | Jain et al. | 370/234 |
| 5,896,371 A | * | 4/1999 | Kobayashi et al. | 370/232 |
| 6,314,085 B1 | * | 11/2001 | Saranka | 370/230 |
| 6,597,662 B1 | * | 7/2003 | Kumar et al. | 370/236 |
| 6,754,177 B1 | * | 6/2004 | Gersht et al. | 370/233 |
| 6,874,032 B1 | * | 3/2005 | Gersht et al. | 709/235 |

OTHER PUBLICATIONS

Shiomoto et al., "A Simple Bandwidth Management Strategy Based on Measurements of Instantaneous Virtual Path Utilization in ATM Networks", IEEE/ACM Transactions on Networks. vol. 6 No. 5, Oct. 1, 1998, pp. 625-633.

Bensaou et al., "Estimation of the Cell Loss Ratio in ATM Networks with a Fuzzy System and Application to Measurement-Based Call Admission Control", IEEE/ACM Transaction on Networks., vol. 5 No. 4, Aug. 1, 1997, pp. 572-584.

Knightly et al., "Measurement-Based Admission Control with Aggregate Traffic Envelopes", Proceedings of the 10th IEEE International Tyrrhenian Workshop on Digital Communications, Sep. 1998.

Clark D., S. Shenker and L. Chang. 1992. Supporting Real-Time Applications in an Integrated Services Packet Network: Architecture and Mechanism. Proceedings of ACM SIGCOMM '92.

Jamin S., P. B. Danzig, J. Shenker and L. Zhang. 1997. A Measurement-Based Admission Control Algorithm for Integrated Services Packet Networks. IEEE/ACM Transactions on Networking, vol. 5, No. 1, Feb. 1997.

(Continued)

*Primary Examiner*—Andrew C. Lee
(74) *Attorney, Agent, or Firm*—Cohen, Pontani, Liberman & Pavane

(57) ABSTRACT

The present invention proposes a measurement-based connection admission control device for a packet data network, comprising at least one measurement module adapted to measure packet data traffic in said packet data network and to output corresponding measurement results; at least one estimation module adapted to perform an estimation to obtain an estimated maximal rate envelope of traffic based on said measurement results, and an admission control module adapted to admit a requested new connection in said packet data network based on the estimated maximal rate envelope of traffic.

14 Claims, 11 Drawing Sheets

OTHER PUBLICATIONS

Adas A. 1997. Traffic Models in Broadband Networks. IEEE Communications magazine, Jul. 1997, pp. 82-89.

Crosby S., I. Leslie, B. McGurk, J.T. Lewis, R. Russell and F. Toomey. 1997. Statistical Properties of a Near-Optimal Measurement-Based CAC Algorithm. Proceedings of IEEE ATM'97 Workshop, pp. 103-112.

Gibbens R. and F. Kelly. Measurement-based connection admission control, 15th International Teletraffic Congress Proceedings, Jun. 1997.

Jamin S. 1996. A Measurement-Based Admission Control Algorithm for Integrated Services Packet Networks. Doctoral dissertation. Computer Science, University of Southern California, USA. p. 1-107.

McGurk B. and R. Russell. 1997. Simple Bounds for Queus Fed by Markovian Sources: a Tool for Performance Evaluation. Dublin institute for Advanced Studies, Technical Report DIAS-STP-97-19.

Norros, I. 1995. On the use of Fractional Brownian Motion in the Theory of Connectionless Networks. IEEE Journal on Selected Areas in Communications, vol. 13, No. 6, Aug. 1995.

Perros H. and K. Elsayed. 1996. Call Admission Control Schemes: A Review. IEEE Communications Magazine, Nov. 1996, pp. 82-91.

Qiu J., E. Knightly. 1998. QoS Control via Robust Envelope-Based MBAC. In Proceedings of IEEE/IFIP IWQoS '98, Napa, CA, May 1998.

Tse D. and M. Grossglauser. 1997. Measurement-based Call Admission Control: Analysis and Simulation. Proceedings of INFOCOM '97, Kobe, Japan.

Fontaine M. and D.G. Smith. 1996. Bandwidth allocation and Connection Admission Control in ATM Networks. Electronics & Communication Engineering Journal, Aug. 1996, pp. 156-164.

Petäjistö A. 1998. An Evaluation of Connection Admission Control Algorithms. Master's Thesis. Espoo, Finland: Helsinki University of Technology, System Analysis Laboratory. p. 1-112.

Heimonen A. 1997. Routing in ATM networks. Master's Thesis. Espoo, Finland: Helsinki University of Technology, Laboratory of Telecommunications Technology. p. 1-79.

Grossglauser M. and D. Tse. 1998. Framework for Robust Measurement-Based Admission Control. Submitted to IEEE/ACM Transactions to Networking.

Lewis J. and R. Russell. 1997. An Introduction to Large Deviations for Teletraffic Engineers. Dublin Institute for Advanced Studies, p. 1-45.

Knightly E. and H. Zhang. 1996. D-BIND: An Accurate Traffic Model for Providing QoS Quarantees to VBR Traffic. IEEE/ACM Transactions on Networking, vol. 4, No. 2, pp. 219-231.

Knightly E. and J. Qiu. 1998. Measurement-Based Admission Control with Aggregate Traffic Envelopes. In Proceedings of the 10th IEEE International Tyrrhenian Workshop on Digital Communications, Ishia, Italy, Sep. 1998.

Liebeherr J., D. Wrege and D. Ferrari. 1996. Exact Admission Control for Networks with a Bounded Delay Service. IEEE/ACM Transactions on Networking, vol. 4, No. 6, pp. 885-901.

McGurk B. and C. Walsh. 1997. Investigation of the Performance of a Measurement-Based Connection Admission Control Algorithm. In Proceedings 5th IFIP Workshop on Performance Modelling and Evaluation of ATM Networks, Jul. 1997.

Qiu J. 1998. Measurement-based Admission Control in Integrated-Services Networks. Master's Thesis. Houston, Texas, USA: Rice University, Electrical and Computer Engineering Department.

ATM Forum 1996. ATM Forum Traffic Management Specification, version 4.0.

Goldt S., S. Meer, S. Burkett and M. Welsh. 1995. The Linux Programmer's Guide, version 0.4 Linux Documentation Project, Mar. 1995. http://metlab.unc.edu/LDP/.

ITU-T Recommendation E.735. 1997. Framework for traffic control and dimensioning in B-ISDN. International Telecommunication Union.

Buhrgard M., T. Westin and G. Wicklund. 1998. A scaleable ATM switching solution. Ericsson Review No. 1, 1998.

ITU-T Recommendation I.371. 1996. Traffic Control and Congestion Control in B-ISDN. International Telecommunication Union.

Castillo E. 1988. Extreme Value Theory in Engineering. San Diego, USA: Academic Press. 389 pp. ISBN 0121634752.

Robert J.W., U. Mocci, and J. Virtamo (eds). 1996. Broadband Network Teletraffic: Performance Evaluation and Design of Broadband Multiservice Networks. COST 242 Final Report. Berlin, Germany: Springer-Verlag. 586 p. ISBN 3540618155.

Robert J.W. (ed). 1992. Performance evaluation and design of multiservice networks. COST 224 final report. Brussels, Belgium: Office for Official Publications of the European Communities, ISBN 928263728X.

Peterson L. and B. Davie. 1996. Computer Networks: A System Approach. Morgan Kaufman Publishers, United Kingdom. ISBN 1558603689.

Stallings W. 1995. Operating systems. Second Edition. Prentice Hall International, 701 p. ISBN 0024154938.

Stallings, W. 1997. High-speed Networks: TCP/IP and ATM Design Principles. Prentice Hall, USA. 632 p. ISBN 0135259657.

Weiss M. A. 1997. Data Structures and Algorithm Analysis in C. Second edition. Addison-Wesley. ISBN 0201498405.

* cited by examiner

Example of measuring peak $R_3$ rate occurring in time window T

Measuring of maximal rate envelope $R_k$ over measurement window $T = 8$.

MEASUREMENT-BASED CONNECTION ADMISSION CONTROL (MBAC) DEVICE FOR A PACKET DATA NETWORK

PRIORITY CLAIM

This is a national stage of PCT application No. PCT/EP99/04238, filed on Jun. 18, 1999. Priority is claimed on that application.

FIELD OF THE INVENTION

The present invention relates to a measurement-based connection admission control (MBAC) device for a packet data network. Particularly, the present invention relates to such a MBAC device for a packet data network, in which plural connections are established via a switch such as, for example, an ATM switch.

BACKGROUND OF THE INVENTION

A great advantage of packet and cell switched networks, like ATM is efficiency. Most traffic in a network is bursty in nature, because most traffic sources like people surfing on the web (i.e. the Internet) or talking to the phone have idle or almost idle periods. When the burstiness is combined with statistical discovery that bursts unlikely occur coincidentally, obviously there is some new efficiency available. We can take advantage of this efficiency with statistical multiplexing, which means having transfer capacity much smaller than the total sum of the peak capacity consumption of users. The term statistical multiplexing gain is used to denote the factor of the efficiency achieved.

The reverse of this efficiency is uncertainty. By providing a capacity less than the sum of peak consumption of users, we always take a statistical risk of congestion. The less capacity we provide, the more likely the offered traffic momentarily exceeds the offered capacity. To prevent the loss of data during rush means to store excess packets into a buffer for a moment. At this point, usually two questions arises: is the buffer large enough to keep the packet loss low enough or is the waiting time of packets in the buffer too long for users? We can think of this also as a kind of intuitive definition of quality of service (QoS). From users' point of view QoS is defined in terms of transfer delay, delay variation and proportional to lost data to send data.

The core idea of the ATM is achieving a combination of these two matters: efficiency and quality of service. With a time-division based system one could have guaranteed QoS for different bandwidth requirements but remarkable loss of efficiency would have been caused by allocation of resources according to absolute peak consumption. Unfortunately, carrying out this promising combination of quality and efficiency has proven much more difficult the early visionaries of ATM thought.

In ATM the functional entity which has responsibility for determining whether there are enough resources for a new connection is commonly named as connection admission control (CAC). The limited resources are bandwidth and buffer space as in the case of any packet switched network. In specifications, it is not detailed how the determination of resource availability should be done. It is up to manufacturer.

In general, connection admission control methods are divided into two groups:

preventive CACs which determine the current usage of resources using traffic descriptor parameters of ongoing connections, announced by users at connection request, and measurement-based CACs (MBACS) which measure the current use of resources.

Because this application focuses on ATM (Asynchronous Transmission Mode) networks as an example of packet data networks, in the following the traffic classification and QoS definitions used in connection with ATM are briefly introduced for subsequent better understanding.

In an ATM network a traffic contract between a user and the network consists of QoS parameters on one hand and connection traffic description on the other hand. The latter one, in turn, comprises a source traffic description, a CDVT (cell delay variation tolerance) parameter and a conformance definition.

The end system, i.e. the network, announces the end-to-end QoS requirements of a new connection in terms of QoS parameters. The QoS parameters are maximum Cell Transfer Delay (maxCTD), peak-to-peak Cell Delay Variation (CDV) and Cell Loss Ratio (CLR). The maxCTD is defined so that the fraction of the cells violating maxCTD, that is, the fraction of the cells delivered late, is equal to or less than the CLR. The relationship between the maxCTD and CDV is clear: CDV is the difference between maxCDV and the minimum possible transfer delay.

Source traffic descriptor consists of traffic parameters describing the behavior of the traffic source of the end system. Four traffic parameters have been defined: Peak Cell Rate (PCR), Sustainable Cell Rate (SCR), Maximum Burst Size (MBS) and Minimum Cell Rate (MCR). Note that PCR, SCR are announced as cells per second whereas MBS is announced in cells.

The CDVT part consist of a single Cell Delay Variation Tolerance (CDVT) parameter. The end system either gives a value for CDVT or accepts the value suggested by the network. The existence of the CDVT value is dictated by the practice, because ATM layer does not work as an ideal transportation medium. In theory, connections having PCR value defined are not allowed to send cells closer to each other than T=1/PCR and therefore the switch could assume that the PCR is the absolute peak rate of the connection. In practice, the ATM layer is not able to transport given cells immediately, because there is a variable transmission delay due to insertion of maintenance cells and an overhead of lower transportation protocol, for example, SDH. As a result, the cell intervals at the user-network interface (UNI) are not constant any more, because some cells arrive closer to each other as clumps or clusters, respectively.

In such a situation of cells arriving in clumps or clusters, one can observe the fluctuating transmission delay with a minimum of $d_{min}$ and a maximum of $d_{max}$. In this case, where the user application is sending at peak rate with interarrival times of T=1/PCR, the cell stream at the ATM link can be described with GCRA(T,CDVT) where $CDVT=d_{max}-d_{min}$. (Note that GCRA denotes a so-called Generic Cell rate algorithm.)

In general, the conformance definitions of the connections in ATM are based on the GCRA algorithm. The number of GCRA leaky buckets and the set of traffic parameters used depend on the service category. Moreover, in certain cases, the end systems are allowed to send more traffic than judged conformant by the GCRA by setting a special Cell Loss Priority (CLP) bit in the header of the offending cells. In the case of congestion in the network, these tagged cells are the first ones subject to discarding.

Furthermore, to serve a wide range of communication needs, ATM provides four service categories. In each category, QoS definition, source traffic description and conformance definition is different due to different characteristics of the services.

Constant bit rate (CBR) service with very small CDV and CLR requirements is intended to emulate circuit-switched connections. In addition to CDV and CLR, also maxCTD is defined for a CBR connection. The source traffic descriptor consist of only PCR parameter, and the conformance definition of the connection is defined by GCRA(1/PCR, CDVT). The CBR service is suitable for real-time applications producing almost constant rate traffic.

There are two types of variable bit rate (VBR) services: real-time (rt-VBR) and non-real-time (nrt-VBR) services. With both type of connections, source traffic descriptor consist of PCR, SCR and MBS parameters, where PCR>SCR. The conformance definition of both rt-VBR and nrt-VBR is defined with two leaky buckets, also called dual leaky bucket: GCRA(1/PCR,CDVT) and GCRA(1/SCR,$\tau$+CDVT), where $\tau$=(MBS−1) (1/SCR−1/PCR). The difference between these two services is in the QoS definition. For rt-VBR, all three QoS parameters, maxCTD, CDV and CLR, are defined, whereas for nrt-VBR, only CLR is defined. VBR services are intended for bursty traffic sources having high peak-to-mean rate ratio. Due to two bit rate parameters, PCR and SCR, the network may take advantage of statistical multiplexing. The rt-VBR is naturally intended for applications having real-time requirements.

Unspecified bit rate service (UBR) has been specified for traditional adaptive data services not requiring any QoS guarantees. Internet-like best effort service enables quite a good utilization of free capacity and therefore compensation of low utilization caused by imperfect CAC of other service classes. Possible congestion control is assumed to be a part of higher protocol layers, like TCP. For UBR connections, no QoS parameters are defined. However, the end system must announce PCR parameter of the source traffic descriptor, because ATM networks may optionally perform CAC check for UBR connections.

To provide a rapid access to the continuously changing amount of unused bandwidth, an available bit rate (ABR) service has been defined. A traffic source using ABR connection adjusts its transmission rate according to the feedback sent by the switches along the connection. ATM Forum specifications defines two kinds of feedback methods. First, a switch may control source implicitly by announcing about congestion with congestion indicator bit in either resource management cells or data cells. Second, a switch may control the source explicitly by telling it the share of the available bit rate at which the source is allowed to send. In the traffic contract, no QoS parameters are defined. The traffic source descriptor consists of PCR and minimum cell rate (MCR) parameters, where the MCR denotes the minimum bandwidth the connection needs. Standard GCRA conformance definition is not applied since the conformance depends on the feedback method used.

Implementation of the ABR service efficiently may be hard, as it requires a lot from CAC. In addition, the need for the ABR service may be arguable as far as IP and especially TCP are run over ATM.

Now, returning to the two different types of CAC methods mentioned above, these are briefly compared with each other.

The motivation for developing MBAC has originated from a few essential drawbacks in ATM traffic model;

First, it is difficult for the user to characterize his traffic in advance and because the network polices traffic contract, the user prefers overestimation.

Second, deterministic traffic model based on leaky buckets is easy to police, but traffic flows with rate variations over multiple time scales are not adequately characterized by two leaky buckets which give only the worst-case upper bound leaving a large fraction of potential statistical multiplexing gain unreachable.

Third, as a result, preventive CAC making decision on the basis of only traffic parameters combines the effect of both of these inefficiencies.

In other words, the main objective of MBAC is efficiency.

Users may describe their sources with very conservative parameters, because the resource demand of connections is determined by parameters only when connections are established—later their real resource need is measured.

Since MBAC determines availability of resources for a new connection on the basis of the measured behavior of existing connections, it is possible to achieve high utilization even with overly conservatively specified traffic descriptors.

MBAC also tolerates burst scale external dependencies of sources, unlike preventive CAC methods, which would allow too many connections.

Characteristics of real traffic such as long-range dependence make modeling of traffic very hard and models complex, and therefore reliable analytical evaluation of the performance of preventive algorithms is hard, especially with those taking large buffers into account.

Moreover, the performance of preventive algorithms in terms of utilization is not very easily compared, because results depend on the traffic model used. Therefore it is difficult to avoid simulations and empirical studies even with preventive algorithms.

One fundamental difference between preventive and measurement-based CAC must be understood:

MBAC offers only a predicted, not guaranteed QoS, whereas preventive CAC suppose worst-case traffic in calculations to guarantee QoS. This is due to the fact that MBAC relies only on measurements and because the behavior of sources varies over time, there is no guarantee that an estimate based on current and past measurements holds in future. If a mistaken estimation is made, MBAC is able to adapt to the new situation but this takes some time depending on the system dynamics.

There is also one conceptual difference between preventive CAC and MBAC. The term CAC and most, if not all, preventive CAC methods originate from the broadband ISDN and ATM world, where tight QoS objectives are assumed. Due to the predictive nature of MBAC, many MBAC proposals are of a very general type and intended to serve any packet switched network, like Internet. Th present application is not concerned with this, because the aim of MBAC, achieving high utilization without violating QoS, is very general and common to all packet switching networks that provide QoS guarantees. For ATM as an example, we should choose a MBAC scheme that is able to preserve even quite strict QoS objectives, but it does not preclude us from investigating different schemes, even those intended for IP networks.

Naturally measurements constitute an essential part of any MBAC system. It is therefore considered first, what it is actually possible to measure.

Remember that a switch can be though of as a collection of multiplexers. Cells arrive into the multiplexer according to some arrival process (at a plurality of input terminals) and leave the multiplexer through shared output link (at least one output terminal). Coincident cells are buffered until they are drawn from buffer to be sent forward. In this model, there are the following basic quantities that can be measured:

1. The number of cells arriving at the multiplexer (before buffering)

2. The number of cells leaving the multiplexer (after buffering)

3. The delay experienced by cells.

The delay itself is a useful quantity, but it is to be noticed that there is no cell rate mentioned. This is due to the fact that the arrival rate, as well as utilization, cannot be measured directly but must be calculated as an average over some interval:

The rate of incoming cells can be calculated counting the number of arrived cells during some interval.

The rate of outgoing cells can be calculated similarly.

Utilization is related to rate, because utilization can be calculated as the ratio of the rate of outgoing cells to the maximum link rate.

Cell loss ratio is defined as the ratio of lost cells to arrived cells, where the number of lost cells is calculated as a difference between the number of arrived and departed cells.

It seems that the three listed measurements are able to fulfill most of the measurement needs.

Among recently introduced MBAC methods, the so-called "Qiu's MBAC" has found considerable attention. This MBAC method has been developed by J. Qui and E. Knightlyly and presented by these in the article: "Measurement-Based Admission Control Algorithm with Aggregate Traffic Envelopes", in: Proceedings of the 10$^{th}$ IEEE ITWDC, Ischia, Italy, September 1998.

However, the rather theoretical approach presented in that paper is not yet perfect in order to be applied to practically existing switch means in packet data networks such as ATM switches.

Namely, having regard to such existing and/or currently used switch means, from implementation point of view, the wide range of delay bound requirements is not the only inconvenient consequence of the existence of several service categories.

Another one is the fact that all service categories must be carried through the same physical interface (i.e. switch means) while simultaneously still conforming QoS requirements of each category.

For example, some basic technologies used to implement service categories in ATM switches are presented herein above.

The basic concept of packet and cell multiplexing is scheduling. Scheduling is considered as a discipline according to which the next cell to be carried by output interface (output terminal) is chosen from a buffer that is always needed to accommodate arrivals of cells.

Whenever the buffer has more than one cell, it is up to the scheduler to choose the next cell to be served.

The cell buffer of a switching unit and/or switch means may be organized in many ways. Although the buffer often physically consists of one shared memory, the cells in the buffer memory are logically arranged into one or more queues.

From theoretical point of view, the scheduler could search and choose the most important cell from the queue but in practice the implementation of any such search algorithm is hard and therefore one usually have as many FIFO queues as needed.

Subsequently, the question arises: how should the FIFO queues be organized and how should the scheduler choose the next queue to be served? Assigning one queue for each connection and serving the queues in round robin fashion would provide fairness among connections, because bursts of one connection would not be able to cause additional delay for other connections. In addition, the service rate of the round robin scheduler should be weighted according to agreed traffic rate of each connection.

However, a weighted round robin scheduler cannot provide statistical multiplexing unless it is able to take advantage of silent periods of any connection to carry bursts of other connections. This in turn complicates the realization of the scheduler.

As a conclusion, per connection queuing sets hard requirements for scheduling discipline as it needs to preserve QoS of connections and still achieve good throughput.

Therefore, a first step of implementation of different service categories in an ATM switch resides in the use of shared static priority queues.

In this scenario, the switch means or switching unit has P static priority queues for each input and/or output, and possibly for each internal transport interface, and the scheduler always serves the queue of the highest priority having cells. Naturally the cells of the highest priority experience the shortest delay. One priority class is usually assigned to one or more service categories.

A wide variety of more sophisticated scheduling disciplines than the static priority, such as the rate-controlled static priority, has been developed. However the static priority implementation, as it is a widely known and used, is far more easy to implement even in large high bit rate systems.

Quite a complete worst-case delay analysis of such (static) priority queues is known from document "Exact Admission Control for Networks with a Bounded Delay Service" by J. Liebeherr, D. Wrege and D. Ferrari, in IEEE/ACM Transactions on Networking, Vol. 4, No. 6, pp. 885–901, 1996.

This document gives equations for theoretical maximum delays in static priority queue systems, assuming the arrival characteristics, i.e. exact arrival constraints are known. However, this document is silent about how these constraints are obtained, for example by measurement, or by other means.

Still further, delay calculations of priority queues are more complicated than in the case of FIFO queues. The delay of the highest priority queue, usually denoted as a priority 1, is the only exception since its delay is same as with FIFO queue. The service rate of lower priority queues is always determined by workload of higher priority queues.

Therefore one of the requirements of the Qiu's MBAC method mentioned later, i.e. the minimum service rate of the queue, cannot be fulfilled, so that Qiu's MBAC method can not be applied to such static priority queues.

Summing up, current MBAC methods, such as the Qiu MBAC method, proposed in the literature are still immature, and not ready-to-use as an all-purpose algorithm in pratical situations. Generally, problems are related to difficult tuning of measurement and estimation parameters.

From the point of view of the ATM technology as an example technology of particular interest for packet data networks, current MBAC proposals proved to have a great number of deficiencies.

Firstly, most proposals assume a simplified switching model consisting of a simple cell multiplexer (switch). In reality, however, the complex traffic model of ATM makes the hardware implementation of switches complicated and for example a static priority queue system cannot be reduced to a collection of multiplexers with constant service rates.

Secondly, real-time services have tight delay variation and cell loss requirements which most MBAC methods are not designed to deal with.

Thirdly, virtual paths complicate admission control, because both VPC (Virtual Path Connection) conformance checks and VPC end point admission control need different admission control checks than normal VCC (Virtual Channel Connection) or VPC cross connections.

Moreover, MBAC methods impose quite a hard processing load on a control device for switch means such as ATM switches when implemented to such commercially available switches means, which up to now has prevented their practical implementation in connection with existing switch means, since a processor overload and even "collapse" of the performance would have to be expected.

SUMMARY OF THE INVENTION

Hence, it is an object of the present invention to provide an practicable implementation of a measurement-based connection admission control device for a packet data network, which is free from above mentioned drawbacks.

According to the present invention, this object is achieved by a measurement-based connection admission control device for a packet data network, comprising at least one measurement module adapted to measure packet data traffic in said packet data network and to output corresponding measurement results; at least one estimation module adapted to perform an estimation to obtain an estimated maximal rate envelope of traffic based on said measurement results, and an admission control module adapted to admit a requested new connection in said packet data network based on the estimated maximal rate envelope of traffic.

Favorable refinements of the present invention are defined in the dependent claims.

Accordingly, the present invention advantageously removes the above mentioned drawbacks. In particular, with the present invention it is possible distribute the heavy workload caused by measurement and estimation operations within a switch means, so that the proposed implementation is also applicable to large-scale switch means (e.g. ATM switches) in packet data networks. Additionally, the proposed implementation is quite effective, and prevents a processor overload and total collapse of performance. Moreover, due top prioritizing counter read and measurement result update operations and using a measurement/update ready indicator queue at the interface between measurement and estimation modules, stability of the device under a processor overload situation can be achieved.

BRIEF DESCRIPTION OF THE DRAWINGS

The present invention will be more readily understood with reference to the accompanying drawings, in which.

DETAILED DESCRIPTION OF THE INVENTION

Figure 1:
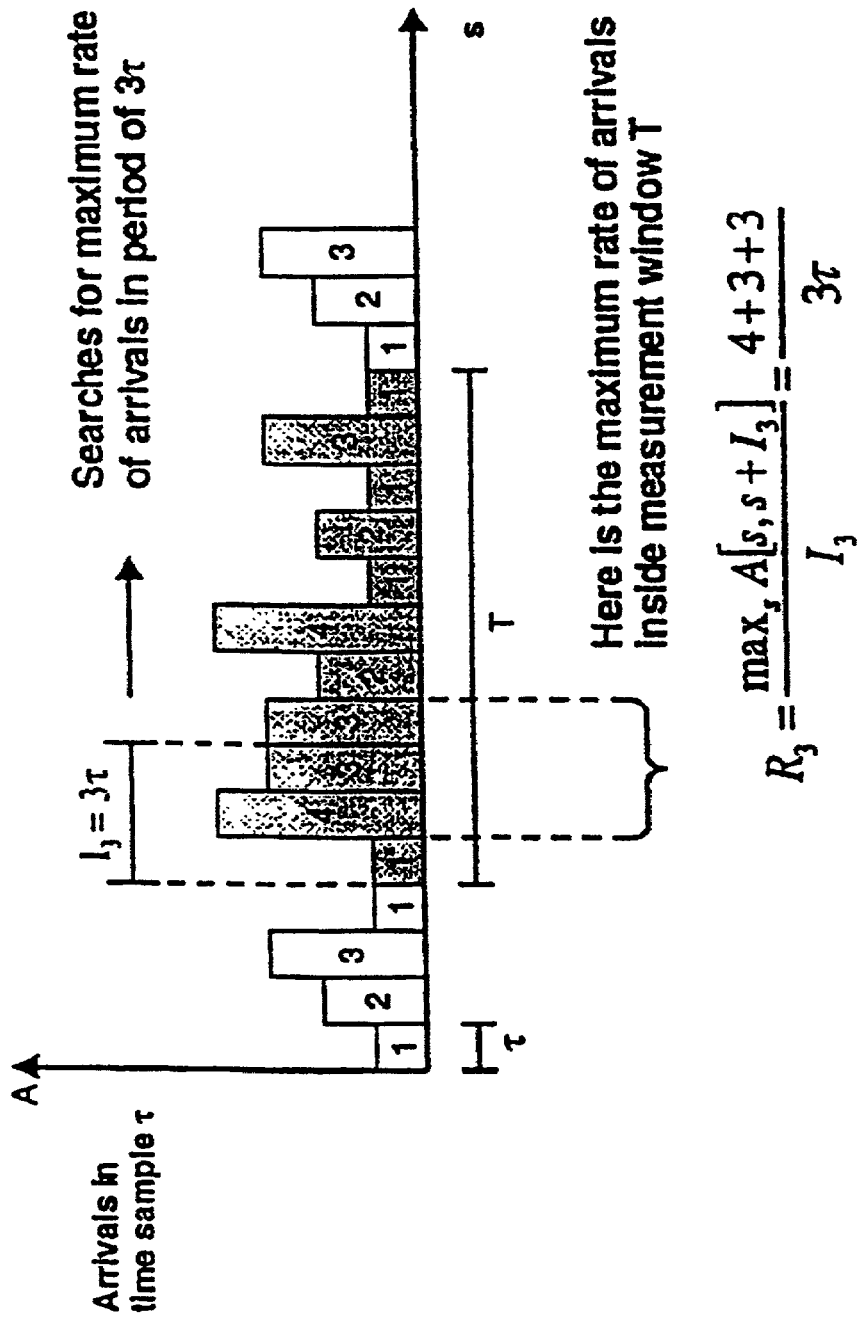
FIG. 1 shows an example of measuring a peak $R_3$ rate occurring during a time window T according to the Qiu MBAC method.

According to the present invention as will be described herein below in greater detail, the present invention implements an MBAC method (either the "original" Qiu's method or a modification of Qiu's method proposed by the present inventor) in a device by dividing the device in different modules, particularly into three modules: measurement module, estimation module and admission control module, and operating these modules in a distributable, stable and effective implementation was developed.

Also, the invention focuses on a description of the architecture for the measurement and estimation modules. These modules take care of the measurement of current ATM traffic and calculation of estimated maximal rate envelope which is described in later on (according to Qiu's MBAC method). All the modifications use Qiu's original estimated maximal envelopes, so that estimation and measurement modules are common to all methods, i.e. to the original one as well as to modified one's. Especially, these two modules can be distributed to every computer unit in an ATM switch, independently from the admission decision module. The distribution is advantageous, because in a large ATM switch a huge amount of measurements are necessary and the calculations of estimated maximal rate envelopes requires a lot of processor time.

Remarkably, with the proposed implementation, the performance of the device does not collapse in processor overload situation, despite the short of calculation power. Only the estimation results are delayed and a bit older measurements are used for estimation, but this should not affect the accuracy a lot.

In brief, the valuable features of the architecture according to the present invention are as follows:

it makes heavy measurement and estimation operations easily distributable and therefore potentially applicable to a large-scale ATM switch, it is implemented effectively, processor overload does not lead to a collapse of the performance.

Since it has repeatedly been mentioned herein before that the proposed architecture implements Qiu's MBAC method or a modification thereof conceived by the present inventor, these methods are now described below for improved understanding of the present invention.

The modified MBAC method conceived by the present inventor starts from Qiu's MBAC method which provides an estimated maximal rate envelope based on traffic measurements. By using this envelope one can form a piecewise linear approximated traffic constraint curve. This curve can easily be made concave, as illustrated below in FIG. 6.

Moreover, the document "Exact Admission Control for Networks with a Bounded Delay Service" by J. Liebeherr, D. Wrege and D. Ferrari, in IEEE/ACM Transactions on Networking, Vol. 4, No. 6, pp. 885–901, 1996, presents how worst-case delays for static priority queues are calculated if the traffic of each queue is limited by concave constraint.

The present inventor has discovered that this approach can be reformulated in terms of the proposed delay equations so that it is only checked, if a given (predetermined) delay bound is violated. Further, the present inventor has proved that the delay violation check with piecewise linear constraints needs to be performed only at those points denoted by numbers 1,2, . . . in the figure above. As a result, a very fast and simple delay test for each queues can be provided.

Thus, according to the modified method conceived by the present inventor, the modified method consists mainly of the steps of providing an estimated maximal rate envelope of the traffic flow based on traffic measurements; approximating said envelope to a piecewise linear traffic constraint curve; modifying said piecewise linear traffic constraint curve such that said curve assumes a concave shape; and checking whether a predetermined delay bound for a new connection requesting to be admitted, and the delay bounds for all lower priority queues (having a higher priority number) are not violated, and granting the requested new connection, if said predetermined delay bounds are not violated.

For still better understanding, a brief introduction in the Qiu's MBAC method is given.

The key idea of this algorithm is to measure maximal rates of the arrival process of the aggregated traffic flow at different time scales and predict the behavior of the flow in the future using these measurements. The algorithm is able to provide an estimate of the packet loss probability and take large buffers into account.

In the most recent approach presented by Qiu and Knightly, the principles of extreme value theory are applied for the cell loss estimation. Therefore we mainly refer to this most recent approach, in which the algorithm is introduced in the form of theorems and proofs. Here we take a slightly different approach to explain the algorithm, because a good understanding is important.

In the Qiu's algorithm, the measurement method characterizing the current aggregate flow is called measuring of maximal rate envelope. The basic idea is to find a set of peak rates over numerous intervals of different lengths during some measurement window T. The resulting maximal rate envelope describes the flow's maximal rate as a function of interval length.

Next we describe the maximal rate envelope formally. Let $A[s, s+I]$ be the number of arrivals in the interval $[s, s+I]$. Cell rate over this interval is $$\frac{\text{number of arrivals}}{\text{time period}} = \frac{A[s, s+I]}{I}.$$

This can be understood also as an average cell rate over the period I. Peak cell rate over intervals of length I inside the past measurement window T is given by $$R = \frac{\max_{s \in [t-T, t-I_k]} A[s, s+I]}{I}.$$

Peak rate R can be understood as the largest average rate over time period of I observed during the measurement window T when time variable s gets all possible values. The set of peak rates over intervals of different length can be constructed simply by using different values $I_k$ in place of interval I. Qiu and Knightly defined $I_k$ to be simply a multiple of $\tau$ which is the smallest time period over which the number of arrivals $A[s, s+\tau]$ is measured:

$$I = I_k = k\tau, k=1, \ldots, T.$$

In practice, $\tau$ is larger than cell transmission time. Note that in the context of this MBAC T is not expressed in seconds but it is a pure integer. The length of the measurement window is obtained by multiplying T with the smallest time period $\tau$:

Measurement window(in seconds)=$T\tau$

Clearly, the linear function I(k) makes the size of maximal rate envelope vector huge when either r is very small or T is very large.

FIG. 1 shows an example of measuring peak rate $R_3$, when $I_k=I_3=3\tau$ and measurement window T=11.

Now we are ready to define the maximal rate envelope R, which is a set of peak rates over intervals $I_k=k\tau, k=1, \ldots, T$ inside measurement window $T_n$:

$$R^n = \{R_1^n, R_2^n, \ldots, R_T^n\}, \text{ where}$$

$$R_k^n = \max_{s \in [t-(n+1)T, t-nT-I_k]} \frac{A[s, s+I_k]}{I_k}.$$

Figure 2:
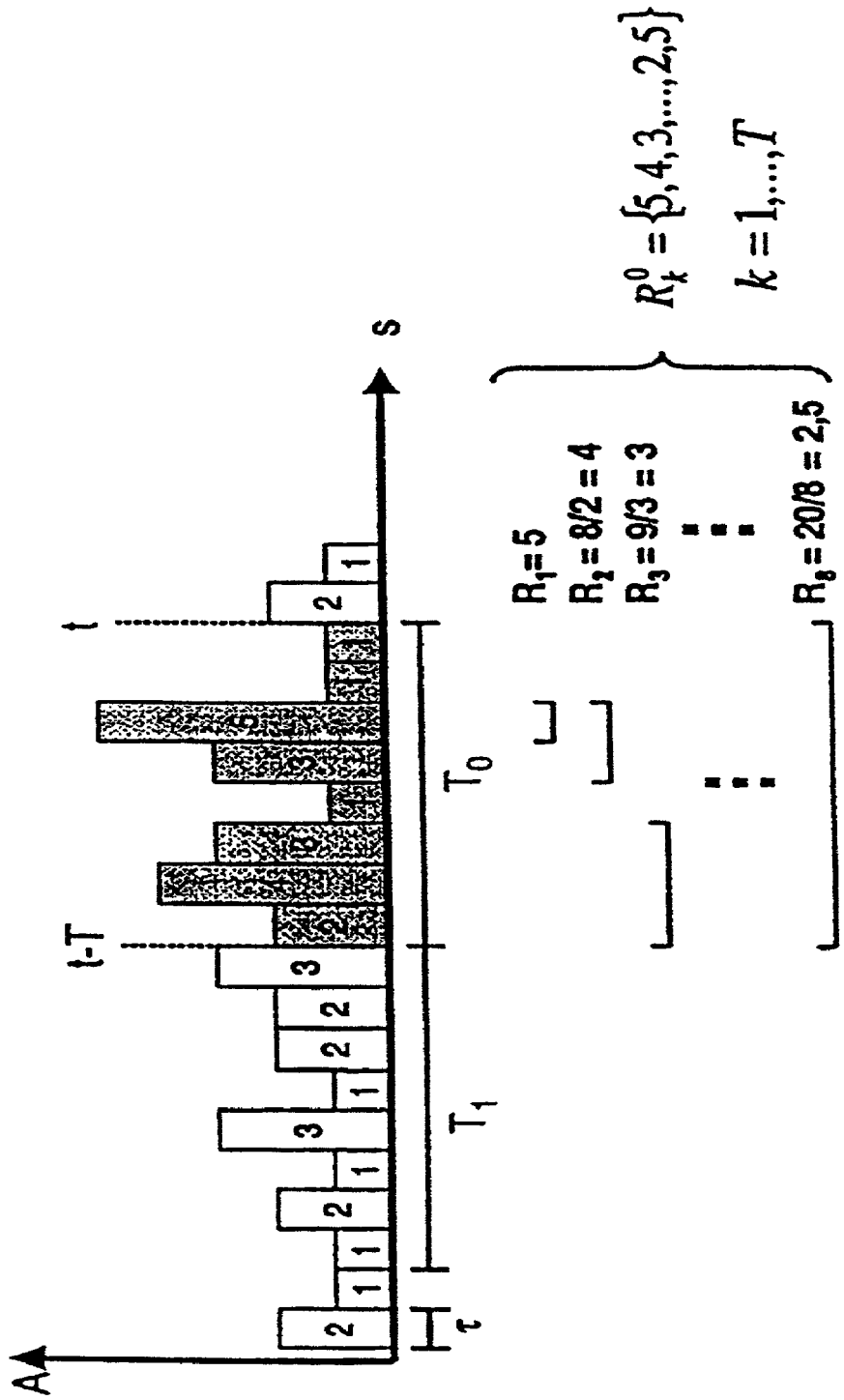
FIG. 2 illustrates the measuring of maximal rate envelope $R_k$ over a measurement window of T=8 according to the Qiu MBAC method.

FIG. 2 shows an example of measuring maximal rate envelope. The index n=0,1, . . . ,N−1 in the equation above denotes that actually N maximal rate envelopes are measured over N past measurement windows for estimation methods.

Maximal rate envelope can also be defined such that the intervals $I_k$ are not restricted to be inside measurement window T but only begin inside T:

$$R_k^n = \max_{s \in [t-(n+1)T, t-nT]} \frac{A[s, s+I_k]}{I_k}.$$

In this way, absolute maximal peak rates over longer intervals are found in contrast to original definition, where the longest interval is not slid at all, because it is equal to $T\tau$, length of measurement window. This may increase the accuracy a little.

The idea of describing the behavior of the traffic flow by its maximal rates over numerous intervals of different length is quite unique among previously known MBAC proposals.

Several benefits of this approach have been attributed thereto. First, a traffic flow's rate and its maximal rate as well are meaningful only if they are associated with an interval length. Second, by characterizing the aggregate traffic flow by its maximal rates instead of mean rates one describes extreme rates of the flow which are most likely to cause buffer overflow. Finally, the variation of maximal rate tends to be less than the variance of traffic flow itself making estimation based on maximal rates more stable. This is due to asymptotic decrease of the variance of maximal rate when the length of observation period is increased.

It is important to observe how the maximal rate envelope describes the behavior of traffic flow over different time scales. This is in contrast to most measurement methods sampling rate over just one interval. The characterization over different time scales is important, since even the same kind of traffic may have very different characteristics.

Although maximal rate envelope describes recent extreme behavior of the traffic, it is incorrect to assume the envelope will bound the future traffic as well. The estimation in this MBAC is based on the behavior of N past maximal rate envelopes.

The theoretical background of the estimation is now explained. Two steps are taken to estimate the future traffic. First, the next maximal rate envelope in future is estimated by determining estimates of mean and variance for each maximal rate $R_k$. Second, to estimate the bandwidth demand of the aggregated flow in respect of target CLR, distributions of each maximal rate $R_k$ are approximated.

A method to get an estimate of future maximal rate envelope is to calculate empirical mean and variance of each envelope element $R_k$ using N past measured sample values:

$$\sigma_k^2 = \frac{1}{N-1} \sum_{n=0}^{N-1} (R_k^n - \overline{R}_k)^2,$$

where $\overline{R}_k$ is the mean of the $R_k^n$'s in past N windows:

$$\overline{R}_k = \frac{1}{N} \sum_{n=0}^{N-1} R_k^n.$$

Although these two basic statistical parameters alone do not predict the future behavior of aggregate flow reliably, together with the knowledge of the nature of the random variables $R_k$ they give means for estimating distributions of $R_k$'s.

As mentioned above, maximal rate envelope describes variations of aggregate flow at time scales up to $T\tau$. However, a single maximal rate envelope does not recognize current long time scale dynamics or trend—for example, whether there is currently more flow arrivals than flow departures or vice versa.

To estimate the effect of long time scale dynamics, a method based on conditional prediction technique has been presented by Qiu. Conditional prediction is used for predicting conditionally next value of mean rate, $\hat{m}_{-1}$, and its variance based on the past measured values $m_{N-1}, m_{N-2}, \ldots, m_0$. Moreover, a normalized envelope is defined as the peak-to-mean ratio $r_k^n = R_k^n / m_n$, where $m_n$ is the mean rate over measurement window $T_n$ during which the peak rate $R_k^n$ is measured. The mean of normalized envelopes is defined as $$\overline{r}_k = \frac{1}{N} \sum_{n=0}^{N-1} r_k^n$$

and the variance as $$\sigma_k^2 = \frac{1}{N-1} \sum_{n=1}^{N} (r_k^n - \overline{r}_k)^2.$$

Finally, the predicted mean $\hat{m}_{-1}$ and the mean of normalized envelopes $\overline{r}_k$ are combined to get predicted value of mean:

$$\hat{R}_k = \overline{r}_k \cdot \hat{m}_{-1},$$

$$\hat{\sigma}_k^2 \leq (\overline{r}_k^2 + \sigma_k^2) \cdot (\hat{m}_{-1}^2 + \Sigma_{22}^{12}),$$

where $$\Sigma_{22}^{12}$$

is the predicted variance of $\hat{m}_{-1}$. Now, the first term of $\hat{R}_k$ reflects the burstiness over intervals of length of $I_k$ in each measurement window and the second term, predicted mean rate, describes the dynamics at time scales longer than $T\tau$. In an actual admission control algorithm (mentioned later), these predicted values $\hat{R}_k$ and $\hat{\sigma}_k^2$ are used instead of simple mean $\overline{R}_k$ and variance $\sigma_k^2$. The difference in performance between using predicted and not predicted estimates is presented further below.

For an admission control algorithm, an estimate of the bandwidth demand of the aggregated flow for a given target CLR is needed. This is due to the fact that in statistical multiplexing, the bandwidth demand of the aggregated flow depends on the target CLR and delay constraint. The effect of buffers causing delay is taken into account in the admission control algorithm.

Because the empirical mean and variance of the maximal rate $R_k$ inside interval of length $T\tau$ are known, a natural way to approach the solution is to assume the distribution of the random variable is known as well, and then write the estimated limit for maximal rate $\tilde{R}_k$ in terms of the mean, standard deviation and confidence coefficient $\alpha$:

$$\tilde{R}_k = \overline{R}_k + \alpha \sigma_k.$$

If the (cumulative) distribution function (cdf) of $R_k$ is $F_k(\bullet)$, then the probability that the random variable, maximal rate $R_k$, will not exceed the value of $\tilde{R}_k$ in the time interval $T\tau$ can be written as $$\Phi_k(\alpha) = P\{R_k \leq \tilde{R}_k\} = P\{R_k \leq \overline{R}_k + \alpha\sigma_k\}$$
$$= \int_{-\infty}^{\overline{R}_k + \alpha\sigma_k} \left[\frac{d}{dx} F_k(x)\right] dx = \int_{-\infty}^{\overline{R}_k + \alpha\sigma_k} dF_k.$$

The motivation for writing bandwidth demand as $\tilde{R}_k = \overline{R}_k + \alpha\sigma_k$ is governed by the fact that with the Gumbel distribution, as well as with the normal distribution, the probability $P\{R_k \leq \overline{R}_k \alpha\sigma_k\}$ remains the same if we normalize the distribution $F_k(\bullet)$ so that the mean is zero and variance is one. Therefore $\alpha$ corresponding to certain probability can be found using normalized distribution without need to find empirical parameters of distribution every time, supposing the distribution $F_k(\bullet)$ itself is known.

Subsequently, the question is how to find a distribution approximating the cdf $F_k(\bullet)$ well enough? If the number of past samples N was huge and measured $R_k$'S were independent of each other, Gaussian distribution would be a natural and safe choice. In this case, however, N is not large enough. Further, the approximation of Gaussian cdf is not accurate with tail probabilities. Gaussian approximation has been used in the first version of the Qiu's MBAC method, anyway.

A good idea introduced by Knightly and Qiu is to take advantage of the extreme value theory. In fact, $R_k$ is not a plain random variable of traffic rate but it is a maximum of several observed values. The extreme value theory in turn describes the behavior of extreme values like minimum and maximum values.

From the collection of distributions describing different asymptotic distributions of the probability $P\{\max\{X_1, X_2, \ldots, X_n\} \leq x\}$ when $n \to \infty$, Knightly and Qiu have chosen the Gumbel distribution to approximate the cdf of $R_k$. Naturally, the asymptotic distribution depends on the distribution of the underlying random variable whose cdf in the case of data traffic rate is generally not known. In Knightly's and Qiu's publication no comparison with data traffic has been made between candidate distributions, so the choice of the Gumbel distribution has not been justified thoroughly. On the other hand, in liertature the Gumbel distribution is proven to describe the asymptotic distribution of the maximum with most of the well-known distributions. Moreover, the simulation results of Knightly and Qiu give reason to believe the choice of the Gumbel distribution works.

The cdf of the Gumbel distribution is given by $$G(x) = \exp\left[-\exp\left(-\frac{x-\lambda}{\delta}\right)\right].$$

Parameters $\lambda$ and $\delta$ are related to mean $\overline{R}_k$ and variance $\sigma_k^2$ as follows:

$$\begin{cases} \delta^2 = 6\sigma_k^2/\pi, \\ \lambda = \overline{R}_k + 0.57772\delta. \end{cases}$$

However, because it is possible to use a normalized distribution instead an empirical one, it is easier to calculate parameters for normalized distribution and use them from this point onward:

$$\begin{cases} \delta_0 = \sqrt{6}/\pi, \\ \lambda_0 = 0.57772\delta_0. \end{cases}$$

Now, using the normalized distribution, the probability that the random variable, maximal rate $R_k$, will not exceed $\tilde{R}_k$ in time interval $T\tau$ is $$\Phi(\alpha) = \exp\left[-\exp\left(-\frac{\alpha - \lambda_0}{\delta_0}\right)\right].$$

This is also the probability that no cell loss will occur, assuming buffers are able to accommodate bursts exceeding the average rate $R_k$ during interval $I_k$. However, the complementary probability $1-\Phi(\alpha)$ does not tell directly an estimate for CLR, since it indicates only the probability that the actual maximal rate $R_k$ will exceed the estimated limit $\tilde{R}_k$, but not how large the exceeding, $R_k - \tilde{R}_k$, is. Even if the expected exceeding $E[(R_k - \tilde{R}_k)^+]$ was known, it would indicate only the average of the maximal exceeding in interval $T\tau$ but not how many smaller exceedings there occur.

Figure 3:
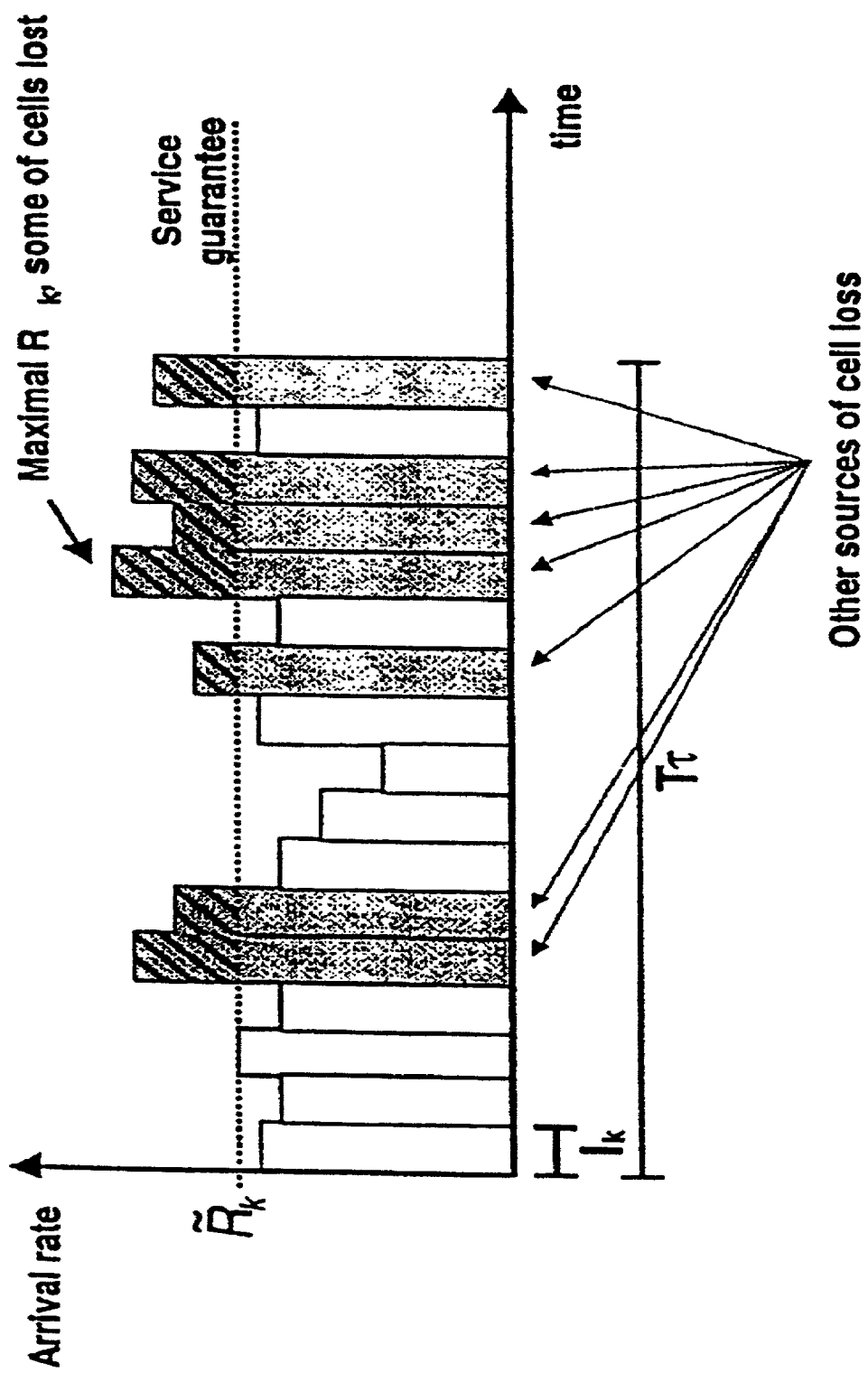
FIG. 3 visualizes that the maximal rate $R_k$ does not contain an information concerning a number of lost cells, because a number of periods during which a service rate is exceeded is unknown according to the Qiu MBAC method.

Given a queuing system able to serve at maximum rate of $\tilde{R}_k$ over interval $I_k$, then an lower bound of number of cells lost in the interval $I_k$ is $(R_k - \tilde{R}_k)^+ \cdot I_k$. Now, if the maximal rate $R_k > \tilde{R}_k$ in the measurement window $T\tau$ is known, we cannot determine the number of cells lost $L_k$, because there may exist other periods of length $I_k$ over which the rate is between rates $\tilde{R}_k$ and $R_k$. FIG. 3 illustrates the problem. According to Knightly and Qiu, the average upper bound of the number of cells lost $E[L_k]$ in measurement window $T\tau$ is determined by assuming the average exceeding $$E[(R_k - \tilde{R}_k)^+]$$

holds over every interval $I_k$ in the measurement window $T\tau$ and the service queue is served at least at the rate $\tilde{R}_k = \overline{R}_k + \alpha\sigma_k$:

$$E[L_k] \leq E[(R_k - \tilde{R}_k)^+] \cdot T\tau,$$

where $$E[(R_k - \tilde{R}_k)^+] = \int_{\tilde{R}_k}^{\infty} (r - \tilde{R}_k) dF_k$$
$$= \sigma_k \int_{\alpha}^{\infty} (x - \alpha) \cdot \left[\frac{d}{dx}\exp\left(-\exp\left(-\frac{\alpha - \lambda_0}{\delta_0}\right)\right)\right] dx$$
$$\approx \sigma_k \delta_0 e^{-\frac{\alpha - \lambda_0}{\delta_0}}.$$

Because the CLR is defined as the number of lost cells per the number of cells sent, CLR can be derived from $E[L_k]$ just by dividing it by $\overline{R}_T T\tau$, where $\overline{R}_T$ is the average rate over intervals of $T\tau$, and finding the time scale which causes the greatest cell loss:

$$CLR = \frac{E[L_k]}{\overline{R}_T T\tau} \leq \max_{k=1,2,\ldots,T} \frac{E[(R_k - \tilde{R}_k)^+] T\tau}{\overline{R}_T T\tau} \approx \max_{k=1,2,\ldots,T} \frac{\sigma_k \delta_0 e^{-\frac{\alpha - \lambda_0}{\delta_0}}}{\overline{R}_T}.$$

Although not addressed by Qiu and Knightly, one should recognize the following supposition: the inequality above is an upper bound for the CLR only in the case where the queuing system has enough buffer capacity to accommodate worst possible burst structure with average rate $\bar{R}_k$ inside interval $I_k$. Both an imaginary typical case and the worst possible case of the buffer need are now considered. The worst case appears when sources behave extremely by sending two bursts of size $R_k I_k$ consecutively, assuming the maximal rate $R_{k+1}$ over longer interval $I_{k+1}$ allows a burst of size $2 \cdot R_k I_k$. Although the maximal rate $R_k$ does not exceed the service rate $C = \bar{R}_k$, a buffer of a size $b_{max}$ is needed to avoid cell loss. The buffer size is dependent on the maximal incoming rate $C_{in\_max}$ which is at most the sum of all incoming links $C_i$:

$$b_{\max} = 2I_k \left[ \frac{C}{C_{in\_max}} (C_{in\_max} - C) \right] = 2I_k \left[ \frac{C}{\sum_i C_i} \left( \sum_i C_i - C \right) \right].$$

It is believed that this is a finding not to be forgotten in the context of admission control and delay estimation, because the maximal rate $R_k$ does not bound the traffic flow or give any other information about it at time scales remarkably shorter than $I_k$.

After introducing the basis for the cell loss estimation used in the context of this (Qiu's) method, we are finally ready to reveal the admission control algorithm.

The algorithm is presented using the two theorems introduced and proved in Qiu and Knightly. Before presenting the theorems, the connection setup information supposed by the method is explained because the algorithm is not designed for any particular network model like ATM.

A new flow is supposed to be bounded by similar maximal rate envelope $r_k$ as the estimated aggregated flow. However, leaky bucket based traffic parameters of ATM are easily mapped to maximal rate envelope. For example, with a CBR connection, the PCR parameter bounds the rate over every interval $I_k$, so the envelope is $r=\{PCR, PCR, \ldots, PCR\}$. For VBR sources, the maximal rate over intervals of length $I_k$ is given by $$r_k = \frac{1}{I_k} \min\left( PCR \cdot I_k, MBS + SCR \cdot \left( I_k - \frac{MBS}{PCR} \right) \right).$$

In the admission control algorithm and/or method, the delay or cell loss requirements of a connection are not explicitly taken into account. Because the algorithm assumes a shared FIFO queue, maximal queue length (buffer size) and service rate determine absolute delay bound straightforwardly:

Delay bound=(buffer size)/(service rate).

In line with the shared queuing scenario, the queue under decision must have a predefined CLR target less than or equal to the CLR of any connection.

Admission Decision Theorem

Theorem 1: Consider a new flow bounded by $r_k$, $k=1, \ldots, T$ requesting admission to a first-come-first-served server with capacity C, buffer size B, and a workload characterized by a maximal rate envelope with mean bounding rate $\bar{R}_k$ and variance $\sigma_k^2$, $k=1, \ldots, T$. With confidence level $\Phi(\alpha)$, no packet loss will occur with admission of the new flow if $$\max_{k=1,2,\ldots,T-1} \{ I_k (\bar{R}_k + r_k + a\sigma_k - C) \} \leq B,$$

and $$\hat{R}_T + r_T + \alpha \hat{\sigma}_T \leq C,$$

where $\hat{R}_T$ is the mean rate over intervals of $I_T$ and $\hat{\sigma}$ its deviation.

This theorem offers the actual admission decision. The first condition of the theorem checks that allocated buffer B is able to accommodate all bursts of length less or equal to $I_{T-1}$ by estimating the buffer need over every interval $I_k$ is less than B. The buffer need is approximated by first calculating the difference between estimated future maximal rate and service rate and then multiplying the difference by the length of the interval $I_k$ in order to get the size of burst in bits.

The second condition of the theorem 1 is referred to as the stability condition in Qiu's and Knightly's aforementioned publication, because it requires that the average rate over $I_T$ is less than the link rate. As a consequence, the busy period of the queue server is less than $I_T$ meaning that queue will not be occupied longer than $I_T$. Note that if $R_k$ is defined according to the equation introduced in connection with FIG. 2, then $\hat{R}_T \neq R_T$ and $\hat{\sigma}_T \neq \sigma_T$ and therefore $\hat{R}_T$ must be measured separately.

To bind the confidence level $\Phi(\alpha)$ to the target CLR, another theorem is proposed:

Theorem 2: Consider an aggregate traffic flow that satisfies the schedulability condition of Theorem 1 and has mean bounding rate $\bar{R}_k$ and variance $\sigma_k^2$ over intervals of length IT. For a link capacity C, buffer size B, and schedulability confidence level $\Phi(\alpha)$, the packet loss probability is bounded by $$\max_{k=1,2,\ldots,T} \frac{\sigma_k \Psi(\alpha) I_k}{\bar{R}_T I_T} \leq P_{lose} \leq \max_{k=1,2,\ldots,T} \frac{\sigma_k \Psi(\alpha)}{\bar{R}_T}, \text{ where}$$

$$\Psi(\alpha) = \delta_0 e^{-\frac{\alpha - \lambda_0}{\delta_0}}.$$

For theorem 2, the upper bound of loss probability was actually derived earlier herein above in the context of estimation. To take the desired cell loss probability into account in the admission decision, the corresponding parameter $\alpha$ must be solved from the theorem 2 using the upper bound inequality.

Subsequently, some important issues about the feasibility of this MBAC are highlighted. We assess here the impact of the theoretical problems more than practical details because the latter ones are considered in later chapters. The estimation of future behavior of maximal rates relies strongly on the assumption that maximal rates of data traffic obey the Gumbel distribution. Naturally some experimental evidence about the distribution of $R_k$'s with different kind of traffic would be welcome to assure that the estimation is able to give correct results even with very small target cell loss probabilities.

A serious theoretical approximation we are concerned about is the correctness of cell loss estimation with small buffer B corresponding delays much shorter than the shortest measurement interval $I_1$. The buffer test in admission decision ensures that the difference between estimated maximal rate $R_k$ and server rate C is so small that buffer B does not overflow over any interval $I_k$. However, as mentioned before, some buffers are needed unless the maximal traffic rate stays constant over whole $I_k$. The problem is emphasized over shortest interval $I_1$, because there are not shorter intervals to reveal higher maximal rates inside $I_1$. To predict delays which are, for example, one tenth of the shortest interval $I_1$ or less, the traffic should be very smooth over whole $I_1$ to avoid excess cell loss.

Actually, according to worst-case calculation $B=b_{max}$ the smallest delay which can be guaranteed if maximal rate $R_1$ does not exceed service rate C is $$d_{min} = \frac{b_{max}}{C} \approx 2I_1 \text{ as } \sum_i C_i \to \infty.$$

However, one must remember that the worst-case traffic scenario mentioned earlier before is very unlikely, as is the best case scenario assumed by the algorithm with very short delays, so in practice the truth lies probably somewhere between these two extremes. In addition, the upper bound of the cell loss estimate is based on the worst-case assumption that the maximal rate $R_k$ holds over every $I_k$ inside measurement window $I_T$. It would not be a surprise if this assumption were able to partly compensate the optimistic assumption because the maximal rate over shorter interval is usually higher and it is unlikely that the maximal rate over shortest interval would hold over $I_T$.

Selection of the shortest and the longest measurement intervals, $I_1$ and $I_T$, is an important theoretical and practical issue. From a practical point of view, both a very large T and a very short $I_1$ increase computational complexity. From a theoretical point of view, the importance of a short $I_1$ was already discussed, so a trade-off between complexity and accuracy exists.

The length of the measurement window $I_T$ is a complicated question with this MBAC. The maximal rates are searched inside $I_T$ but their mean and variance are calculated using measurements of N past windows. Therefore there are actually two measurement windows of lengths $I_T$ and $N*I_T$.

Fortunately, the algorithm should be robust against the choice of $I_T$. According to Knightly and Qiu, this is due to opposite behavior of the two admission tests, buffer occupancy test and stability test in function of $I_T$. With a short $I_T$, the stability test behaves conservatively because the variation of mean rates among N windows of length $I_T$ is large and therefore the variance of mean $\overline{R}_T$ is large. The mean of mean rates $\overline{R}_T$ over N past windows is not much affected by the choice of $I_T$. In contrast, the buffer test becomes more conservative (or realistic) when $I_T$ is increased because larger windows obviously present larger maximal rates. For these reasons Qiu and Knightly argue that there exists an optimal choice of $I_T$, and a wrong choice only compromises utilization, not quality of service. If the $I_T$ is not too optimal, then it should be possible to occasionally optimize $I_T$, for example, by trying which test fails when service rate C is decreased under current workload.

As the choice of $I_1$ is determined by limitations of implementation and as the choice of $I_T$ could probably be adjusted automatically, the only parameter without clear guidelines is N, the number of past windows to take into account in mean and variation calculations. Recalling Tse's stability analysis of measurements, it is easy to imagine that with too large an N the CAC could not react fast enough to changes in flow dynamics. Probably the use of conditional prediction makes the algorithm more robust against the choice of N. It is suggested to use N=8 or N=10. Without conditional prediction, the algorithm will probably allow too many connections in the transient state where initially an empty system is rapidly filling with connection, because the mean rate remains low, unless the variation becomes so large that it can compensate a too low mean rate.

None of Qiu's and/or Qiu's and Knightly's publications does directly suggest how to handle very frequent connection requests. Before a new estimated rate envelope is ready, new connections accepted meanwhile are not taken into account in measured variables—this leads to overload.

The solution to this resides in the following: advertised rate envelopes of flows admitted after the last estimation are added to the requested flow's advertised envelope before using it in admission decision. This makes the algorithm a bit conservative under high load and also relieves the real-time requirement of the estimate updates. As a whole, this MBAC seems to be the most convincing one of those introduced in this work because it characterizes traffic over many time scales and because it should be quite robust against the choice of measurement time scale in contrast to previous methods.

Nevertheless, with the Qiu's method described up to here, the problems mentioned earlier in using it under practical packet data networks such as ATM networks still exist.

Note that in previous publications dealing with CAC and/or MBAC methods, algorithms are introduced for a simplified environment, like for one FIFO queue.

However, when the implementation of CAC and/or MBAC in an ATM switch is considered, a number of new problems are encountered, which are solved by the present invention.

To keep the discussion and explanation of the present invention at a practical level, we have chosen Qiu's maximal rate MBAC algorithm as a basis and this Qiu's MBAC method is adapted to ATM as an example of a packet switched network.

Recall what kind of multiplexing environment and what information is required for the employment of the maximal rate algorithm:

1. A shared packet or cell queue with buffering capacity B (in bits) which is serviced using first-in-first-out (FIFO) scheduling discipline, 2. Target cell loss ratio $P_{loss}$ 3. Minimum service rate S 4. Measured maximal rate envelope, $R=\{R_1,R_2,\ldots,R_k\}$, $k=1,2,\ldots,T$, of the recent workload of the queue, 5. Maximal rate envelope $r=\{r_1,r_2,\ldots,r_k\}$, $k=1,2,\ldots,T$ bounding the connection requested.

Several conclusions can be drawn from these assumptions. Firstly, the algorithm in its basic form requires the switching system to consist of shared queues that are served with FIFO scheduling and cell arrivals of each queue to be counted by hardware. Secondly, the algorithm does not accept direct delay constraints for the queues. Instead, the buffer size and the minimum service rate of the queue determine the delay constraint:

$$\text{delay} = \frac{\text{buffer capacity}}{\text{minimum service rate}}.$$

Third, due to FIFO queuing the delay constraint of the queue must be chosen according to the connection having the tightest delay constraint. Consequently, in order to increase the utilization by extensive buffering of connections with looser delay constraints one must have several queues with different delay bounds.

An ATM network is supposed to be able to provide particular services with such a high QoS level that the Internet is not imagined to provide even far in the future. This is partly due to historical reasons: ATM was chosen to be an implementation technique of the B-ISDN, which in turn was designed to be the successor of the narrowband ISDN network providing digital service of very high quality.

From CAC's viewpoint, the real-time services of the ATM are the most demanding. ITU-T has defined the end-to-end cell delay variation (CDV) objective of QoS class 1 (QoS class 1 defines QoS objectives for Deterministic Bit Rate and Statistical Bit Rate 1 ATM transfer capabilities which correspond to CBR and VBR services of ATM forum) to be 3 ms with exceeding probability of $10^{-8}$ and the end-to-end CLR to be $10^{-7}$, or $10^{-8}$ if possible. Because one connection may traverse even dozens of switches, the delay variation due to queuing of real-time connections must be of the order of hundreds microseconds.

For the maximal rate MBAC (i.e. Qiu's MBAC) very tight delay constraints seem to be a problem. As mentioned before, the cell loss estimation is based on the assumption that the switch has some buffers to accommodate variations inside the measurement interval $I_1$. While the variations inside intervals of $I_k$, k=2, . . . , T are mostly characterized by maximal rates over shorter intervals, the variations inside the shortest intervals $I_1$ are not characterized at all. For this reason, when the buffer size B is very small in comparison to the number of cells arriving during $I_1$, the probability that the buffer is not able to accommodate variations, increases.

To predict delays that are very short in comparison to the shortest measurement interval, a simple modification of the maximal rate algorithm (Qiu' MBAC) is presented. The improved algorithm is based on two components: traffic contract based peak rate of the queue and the estimated maximal rate envelope of the original algorithm, $R_k = \overline{R}_k + \alpha\sigma_k$, k=1,2, . . . ,T .

Because we are concentrating on packet networks such as ATM networks now, we can assume that for any input queue in the switch the deterministic traffic constraint function is defined by the PCR and CDVT parameters of the connections flowing through the queue. Further, if the shaping effect of the upstream queues inside the switch is known, that is, the change of cell delay variation, then our model is suitable for any constant rate FIFO queue in an ATM switch.

A combination of deterministic traffic constraint and estimated maximal rate envelope gives a traffic constraint function (no shown) of a shape that can be described as follows: the rectangular portions as a function of time intervals denote the estimated maximal rate envelope limiting the maximal number of arrivals over periods $I_k$. Inside interval $I_1$ the maximum arrival rate is limited by PCR, the total peak rate of connections. A burst at the beginning, BPCR, is due to delay variations and it is determined by the leaky bucket ($PCR_i$, $CDVT_i$) of each connection i according to equation $BPCR = \Sigma_i PCR_i \cdot CDVT_i$. With this function, the worst-case delays are obtained when assuming that i) Total peak rate PCR is larger than service rate S ii) Estimated maximal rate $R_k$ over any interval $I_k$ is less than service rate S.

With these assumptions we can easily calculate the delays occurring with the function:

Delay $d_0$ is determined by queue service rate S and BPCR:

$$d_0 = \frac{BPCR}{S}.$$

Delay $d_1$ is determined by BPCR, PCR, S and estimated maximal arrivals $R_1 I_1$:

$$d_1 = \frac{R_1 I_1}{S} - \frac{R_1 I_1 - BPCR}{PCR}.$$

Delays $d_2$ . . . $d_T$ are calculated identically:

$$d_i = (R_i I_i - R_{i-1} I_{i-1})\left(\frac{1}{S} - \frac{1}{PCR}\right).$$

For the cases other than assumed above we may conclude as follows:

a) S>PCR: some delay occurs only at the beginning due to BPCR and therefore the only delay to check against delay constraint is $d_0$.

b) If $R_i$>S for some i=1, . . . , T: This kind of situation suggests there may be long busy periods and therefore small delay constraint is hard to preserve unless the traffic is totally smooth at short time scales. Therefore it is reasonable to exclude this kind of situation by requiring that S>$R_i$ for all i.

c) $R_i$>PCR for some i=1, . . . , T: This odd situation might occur due to variations of maximal rates or at least it might be difficult to show that the situation is impossible. However, it does not matter whether the situation is possible or not because the condition S>$R_i$ ensures that the estimate never exceeds service rate, and therefore the condition S>PCR holds and according to a) only $d_0$ is checked.

From the calculations and conclusions above we can draw the admission control algorithm where D denotes the maximum delay allowed:

If new total PCR is less than service rate S then
if $d_0$<D then
accept connection
else
deny connection
else
if S>$R_i$ for every i and $d_i$<D for every i then
accept connection
else
deny connection Remember that the buffer size required for the queue under decision is B=D·S.

One must understand that the (modified) algorithm presented above is only the first step towards an improved MBAC controlling very small delays. The original (Qiu's) algorithm is able to give only an estimate of the maximal number of arrivals over shortest interval $I_1$ and because the target CLR is already taken into account in estimation, we must ensure that no remarkable cell loss occurs due to traffic fluctuations at time scales shorter than $I_1$. Because measurements do not directly provide any information about these short-range fluctuations, we chose a deterministic way to approximate short delays. To get more efficient CAC for real-time traffic one must estimate the effect of short-range fluctuations either with statistical means or with another measurement methodology.

Despite the worst-case approach, our improved algorithm is able to provide better utilization than the peak rate allocation $S \geq \Sigma_i PCR_i$ if the sources are not sending at their peak rates.

However, judging the maximum ratio of PCR/S allowed as a function of ratio $R_1/S$, where $R_1$ is the measurement-based estimate of maximum rate over $R_1$, the algorithm does not perform very well. For example, with 1 ms delay constraint and completely smooth traffic with rate $R_1/S=0,5$ the algorithm achieves utilization of only $0,5*1,25=0,625$ although the utilization close to one would be possible due to smooth traffic. However, it is still 25 percent better than the peak rate allocation based only on traffic contracts.

In consequence, according to the proposed modification as conceived by the present inventor, a still further modified algorithm for static priority queues is proposed, starting from the maximal rate MBAC algorithm, i.e. Qiu's MABC method.

Particularly, delay calculations of priority queues are more complicated than those of FIFO queues. The delay of the highest priority queue, usually denoted as a priority 1, is the only exception since its delay is same as with FIFO queue. The service rate of lower priority queues is always determined by the workload of higher priority queues.

A fairly complete worst-case delay analysis of priority queues is presented in literature by Liebeherr et. al (mentioned before). Advantageously, the performance analysis of static priority queues as presented in literature by Liebeherr et. al (mentioned before) is used in a suitable modification conceived by the present inventor in connection with the proposed method according to the present invention.

Liebeherr et. al. give deterministic delay bounds of static priority queues both for concave and non-concave traffic constraint functions. For concave traffic constraints, the maximum delay of the queue of priority p is $$d_{max}^p = s_{min}^p + \max_{t \geq 0}\left\{\min\left\{\tau \middle| S \cdot (t+\tau) \geq \sum_j A_j^p(t) + \left[\sum_{q=1}^{p-1} A_j^q((t+\tau)^-)\right] - s_{min}^p + \max_{r>p} s_{max}^r, \tau \geq 0\right\}\right\}.$$

Here $A_j^p(t)$ denotes the traffic constraint function of the connection j of priority p indicating the time required to serve cells arrived by the time t; $s_{min}^p$ denotes the minimum service time of a packet of priority p and $s_{max}^r$ denotes the maximum service time of a packet of priority r. However, the service times of ATM cells are equal and negligible, so as the inventor found out in the course of his research, the equation may be simplified just by leaving out (neglecting) all three s terms.

Suppose we are given the constraints of aggregated traffic, Ap, instead of individual constraints $A_j^p$ such that $$A_P = \Sigma_j A_j^p$$

and $$A^{1,p-1} = \sum_{q=1}^{p-1} \sum_j A_j^q.$$

Further, due to negligible cell transmission times we may approximate $A^{1,p-1}(t+\tau)^- \approx A^{1,p-1}(t+\tau)$. As a result, the maximum delay is $$d_{max}^p = \max_{t \geq 0}\{\min\{\tau | S \cdot (t+\tau) \geq A^p(t) + A^{1,p-1}(t+\tau)\}\}.$$

Figure 4A:
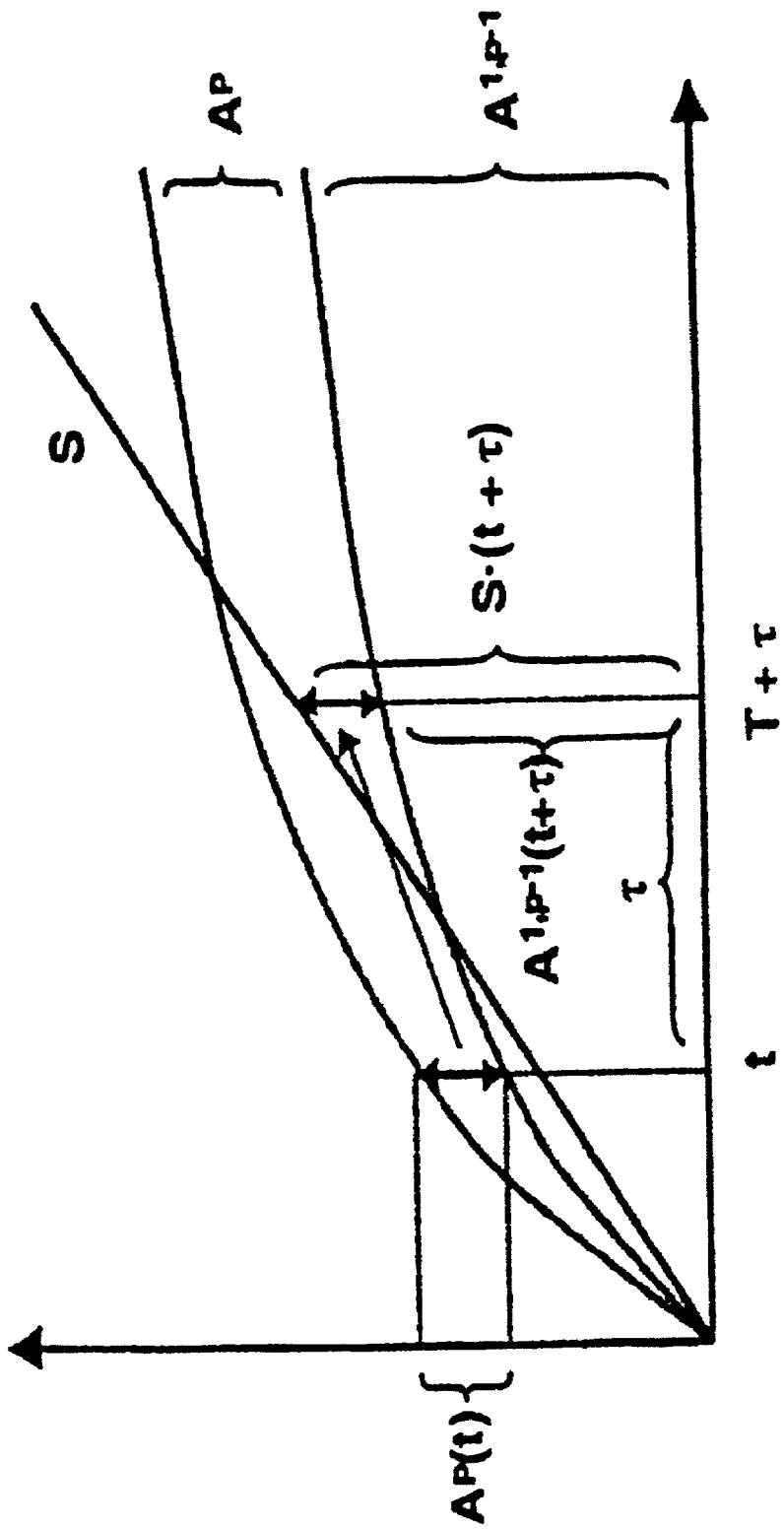
FIG. 4 illustrates an interpretation of delay $\tau$ according to a modification of Qiu's method proposed by the present inventor (FIG. 4A), and an interpretation of delay violation check according to a modification of Qiu's method proposed by the present inventor.

To interpret the equation above intuitively, consider the time t as the arrival time of a tagged cell of priority p. Then, the inner minimization indicates the first moment $\tau$ when the scheduler has had enough free cell slots between higher priority cells to serve all of the cells of priority p arrived by the time t, Ap(t), including the tagged cell. See FIG. 4A for visual interpretation of the delay $\tau$. If the maximum delay is not interesting but only the knowledge that the predefined delay bound $D_{max}^p$ is not violated, then the following delay violation test gives a sufficient condition, assuming it holds for all $t \geq 0$:

$$S \cdot (t+D_{max}^p) \geq A^p(t) + A^{1,p-1}(t+D_{max}^p).$$

Figure 4B:
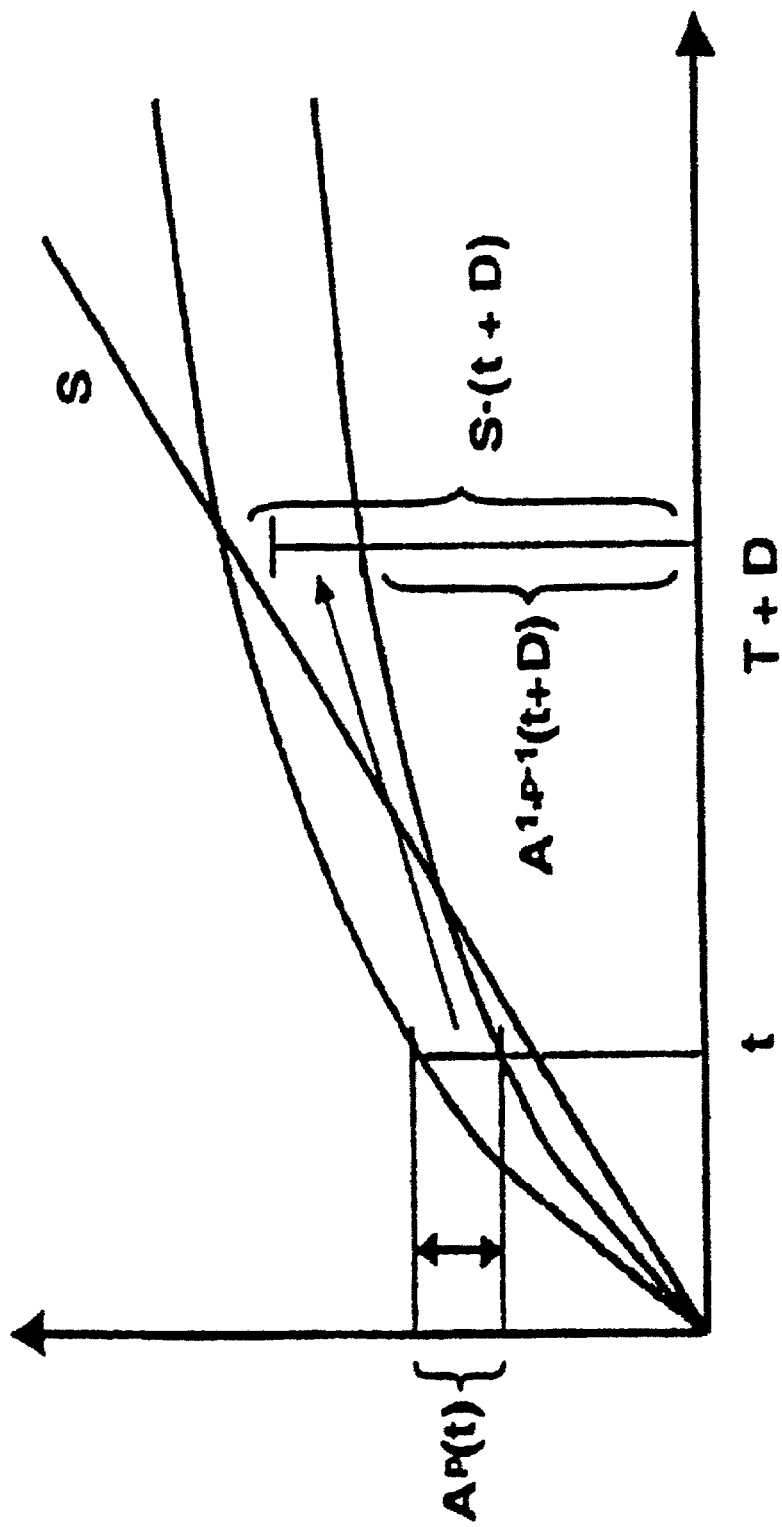

This condition follows directly from the delay equation. FIG. 4 illustrates the condition visually.

From a practical point of view, it is important that both the delay equation (illustrated in FIG. 4A) and the violation test above (illustrated in FIG. 4B) hold for all concave traffic constraints, like piece-wise linear constraints, because many traffic contracts and measurement methodologies provide piece-wise linear constraints.

Figure 5:
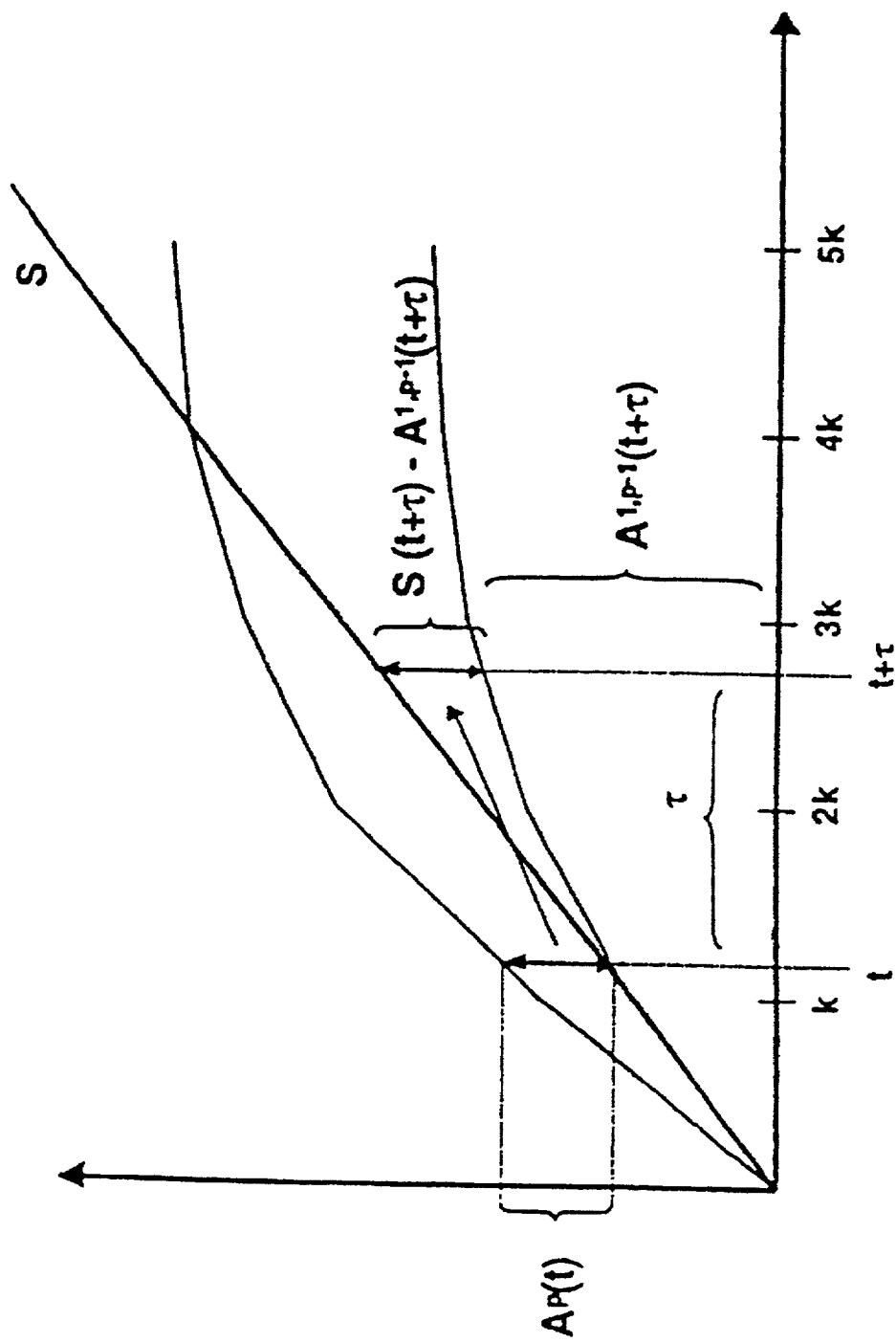
FIG. 5 shows the delay $\tau$ in connection with piecewise linear traffic constraints according to a modification of Qiu's method proposed by the present inventor.

Actually, the use of the equations in practice is much easier with piece-wise linear constraints because the maximum delay may occur only with certain values of t. To prove this claim, suppose the case of FIG. 5 where we are given piece-wise linear constraints $A^p$ and $A^{1,p-1}$ which are both linear over periods of k. Further, suppose we have found the delay $\tau$ for certain t, satisfying $$S \cdot (t+\tau) = A^p(t) + A^{1,p-1}(t+\tau).$$

Then, consider how the value of $\tau$ changes if t is either increased or decreased:

i) When t is increased, r increases until $t+\tau=3k$, because the function $A^p$ grows faster around t than the difference $S-A^{1,p-1}$ does around $t+\tau$, that is, $$\frac{d}{dt}A^p(t) > \frac{d}{dt}[S(t+\tau) - A^{1,p-1}(t+\tau)].$$

Note that the difference $S-A^{1,p-1}$ is used to serve priority p cells arrived by the time t.

ii) After t+r has passed the value of 3k, r starts to decrease, because now the difference $S-A^{1,p-1}$ grows faster than the function Ap does around t, that is, $$\frac{d}{dt}[S((3k)^+) - A^{1,p-1}((3k)^+)] > \frac{d}{dt}A^p(3k-\tau).$$

We can conclude that the increase or decrease rate of r stays constant until either t or t+τ reaches next integer multiple of k because the rate of change of τ depends only on the derivative of $A^p$ around t and the derivative of difference $S-A^{1,p-1}$ around t+τ. Due to piecewise linearity, these derivatives stay constant until the next multiple of k is reached. As a result, the global maximum of τ may occur only either when t=n·k or t+τ=n·k, where n=1,2 . . . .

From the viewpoint of our delay violation test, this result is remarkable. If the delay bound $D_{max}^p$ is a multiple of k, the violation test needs to be performed only with values t=n·k. To prove that, we first consider the maximum delay such that r>$D_{max}^p$. Then the maximum is found either when $t_m$=n·k or $t_m$+τ=n·k. In the former case the condition $$S\cdot(t+D_{max}^p) < A^p(t)+A^{1,p-1}(t+D_{max}^p)$$

holds at least when t=$t_m$. In the latter case, when t is increased to the next multiple of k, so that t>$t_m$, the endpoint of busy period, t+τ, must advance unless the service rate S is infinite at the moment $t_m$+τ and therefore our condition check reveals the violation.

Let us sum up our priority queue algorithm:

Consider a static priority queue system with total service rate of S and with P queues having each an individual delay bound $D_{max}^p$ defined, where $D_{max}^p$=i·k,i∈N. In addition, traffic constraint $A^p$(t) of the current workload of each queue is given and these constraints are linear between values t=n·k, n=1,2, . . . ,T. Also similar traffic constraints of total current workload of queues from priority 1 to p, A1,p−1, are given, where p=1,2, . . . ,P.

Now, consider a new connection of priority q with an arrival constraint a(t) requesting admission, where a(t) is also linear between values t=n·k.

The admission is granted, if both the following condition holds for all n=1,2, . . . ,T $$(nk+D_{max}^q)\cdot S \geq A^q(nk)+a(nk)+A^{1,q-1}(nk+D_{max}^q)$$

and the following condition holds for all p=q+1, . . . , P and n=1,2, . . . ,T $$(nk+D_{max}^p)\cdot S \geq A^p(nk)+A^{1,p-1}(nk+D_{max}^p)+a(nk+D_{max}^p).$$

Usually there are only a few different priorities, so the test is not much more complicated than the buffer test in Qiu's MBAC.

Figure 6:
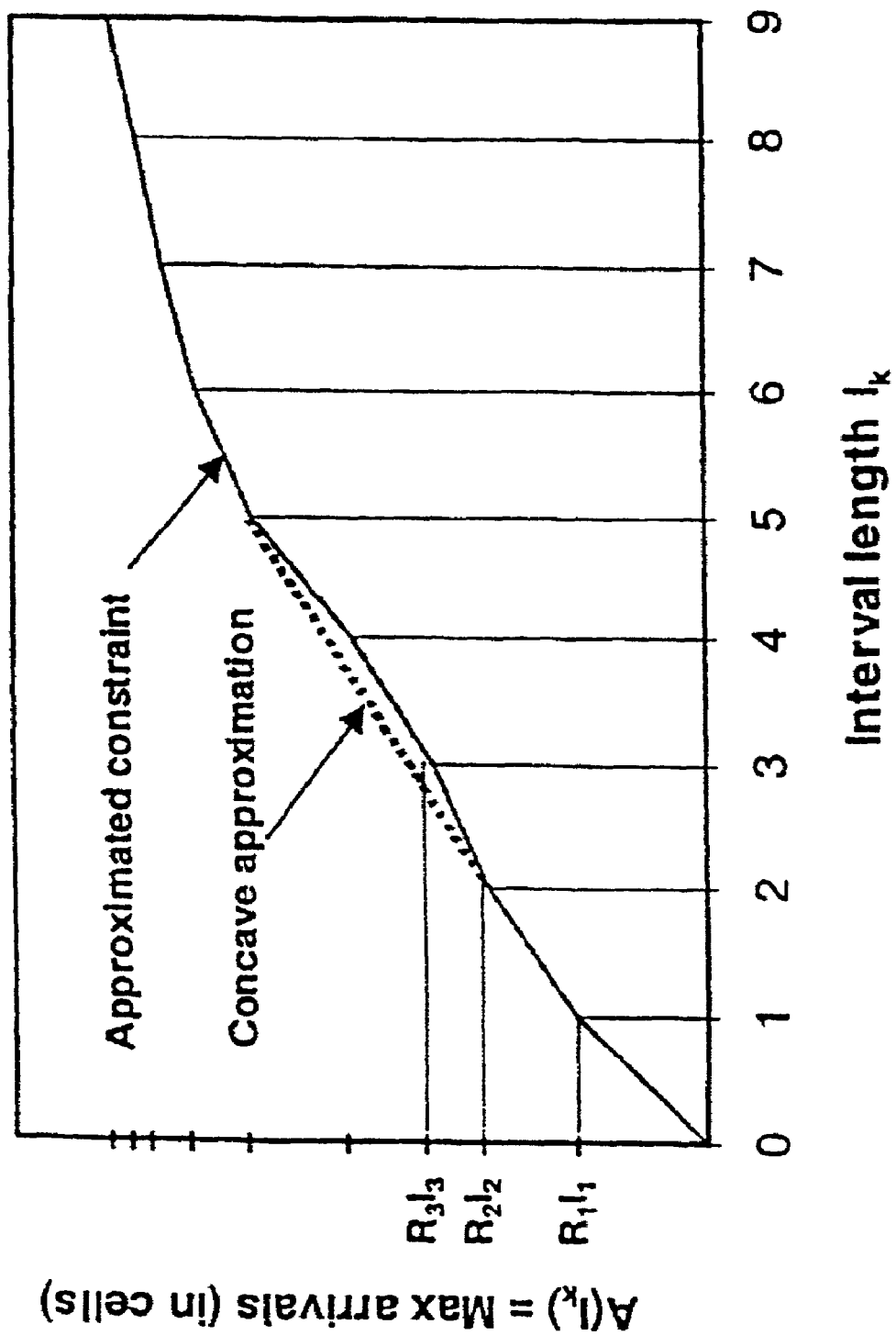
FIG. 6 illustrates the steps of piecewise linear approximation and subsequent modification to obtain a concave shaped traffic constraint curve.

Since we have a simple admission control test for concave, piece-wise linear traffic functions, the next question is: how do we actually get such traffic constraint functions? Recall that a piecewise linearization of estimated maximal rate envelope $R_k = \bar{R}_k + \alpha \sigma_k$, k=1,2, . . . ,T, represents an approximated traffic constraint function of FIG. 6 and that due to probability of overflow of small buffers, the approximation is justified only if the delay bound $D_{max}^p$ is at least of the order of magnitude of the shortest measurement interval $I_1$. However, because the maximum rate envelope decreases only near monotonically as a function of interval length, the traffic constraint function is not completely concave. Therefore a concave approximation must be done as illustrated in FIG. 6. Coding an iterative function that makes the traffic constraint concave is not too complicated a task and therefore not described herein in detail.

Concave approximation has some performance drawbacks. Firstly, especially with quasi-periodic traffic, like MPEG coded video, the concave constraint degrades performance. Secondly, every new estimated maximal rate envelope must be made concave before any CAC decision.

To avoid such performance problems of concave approximation, one could use the delay equation with non-concave traffic constraints, presented by Lieberherr et al., to develop another method.

However, maximum delay with non-concave constraints is more complicated and at least admission decisions as conceived by the present inventor and derived from the delay equation of Lieberherr et. al. resulted in a complicated decision with a complexity of O($n^2$) where n is the number of elements in maximal rate envelope.

Because the estimate update interval is typically of the order of seconds, under high load one estimate is likely to be used for several CAC/MBAC decisions and therefore concave approximation with simple O(n) admission check should be a more stable choice. Finally, note that computational complexity of the simple admission check equals that of the original algorithm's admission check which also has O(n) running time.

Another performance related issue is the estimation of the traffic constraint of aggregated traffic of priorities from 1 to p−1. The simplest solution is to sum the individual constraints:

$$A^{1,p-1} = \sum_{q=1}^{p-1} A^p.$$

However, this compromises utilization, since each constraint is estimated in respect of cell loss and it is very unlikely that all queues behave extremely at the same time. Better utilization is achieved by measuring and estimating maximal rates of aggregated traffic of priority queues from 1 to p−1 for all p=2, . . . ,P−1, where P is the lowest priority queue having a delay bound defined.

Finally, note that one may use any other CAC method for real-time queues and apply the MBAC method only for non-real-time queue(s). Consider a case where CBR connections are directed to the highest and rt-VBR connections to the second highest priority queue. The third priority queue is used for nrt-VBR connections, and the fourth for UBR traffic. The MBAC is used only for CAC of nrt-VBR connections to achieve high link utilization. In this case, the only constraints needed are $A^{1,2}$ and $A^3$.

So far we have concentrated only on the allocation of physical resources, like the bandwidth of an output link, the service rate of a scheduler or the buffer space of an interface unit. Although these physical resources ultimately determine the quality of service experienced by cross-connected connections, there are also logical resources in an ATM switch to be controlled by CAC according to another aspect of the present invention. In ATM, VC connections (VCC) are carried logically inside VP connections (VPC) by giving a VP identifier to VC connections. Every VPC has a traffic contract similar to a contract of VCC, including service category and traffic description. An ATM network node may perform either VP, VC or both VP and VC cross connections.

Figure 7:
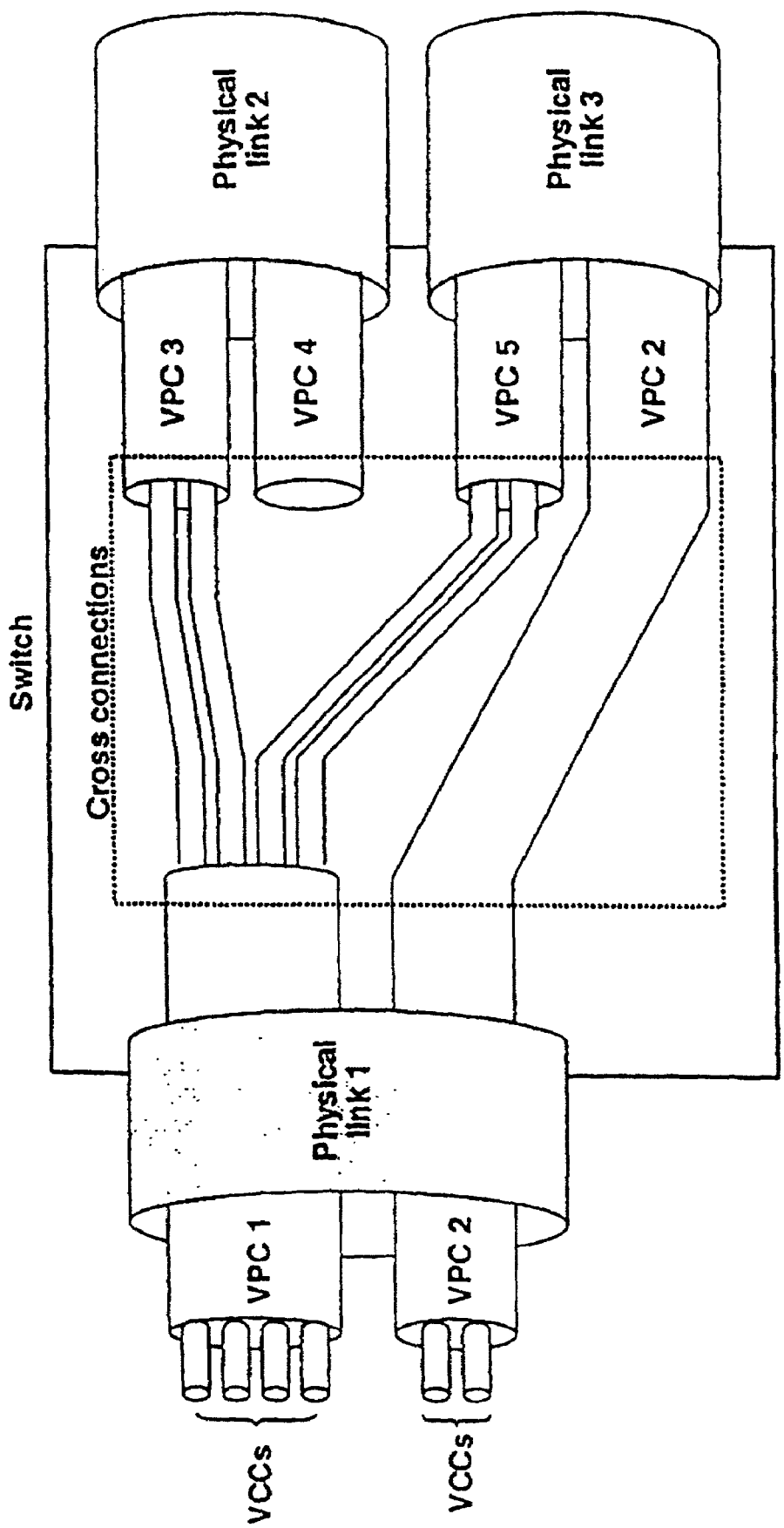
FIG. 7 shows VC (Virtual Channel) and VP (Virtual Path) cross connections in a switch means such as an ATM switch.

In VP cross connection, cells are forwarded to the proper output link according to VP identifiers. The VPC can be seen as a bunch of VCCs, but the switch is not aware of the number or the nature of those VCCs. It only needs to know the traffic descriptor of the VPC to make CAC decision and reserve resources. In FIG. 7, the VPC 2 illustrates the cross connection of a VPC. Note that in practice the VP identifiers are changed even in this case, because VC and VP identifiers are always link specific. However, from resource management's point of view, the change of identifiers has no meaning and therefore the identifiers of VPCs in FIG. 7 do not correspond to the real identifiers.

In VC cross connection, VPCs end up and they are broken down into VCCs. Individual VCCs need to change into other VPCs due to possibly different destinations links. In this case, the switch sets up cross connections separately for each VCC, meaning that each VCC is going to travel under a new VPC and the cells are forwarded to the proper output links depending of their new VPC. In VC cross connection, the switch needs to know the traffic descriptor of each VCC, because different VCCs consume different resources, like the bandwidth of different links. FIG. 7 illustrates also VC cross connection.

Note that in VC cross connection VPCs are terminated in the switch, like VPC 1, 3, 4 and 5 in FIG. 7. Terminated VPCs are also called VPC end points and we may consider them as logical resources, because the switch may but it does not have to reserve any resources for them. An empty VPC, like VPC 4, does not carry any cells and therefore in reality it does not consume any bandwidth or buffers.

However, even VPC end points have service category and traffic descriptor defining PCR, SCR etc., because the next switch may perform only VP cross connection and it has to know the traffic descriptor to determine sufficiency of physical resources. As a consequence, the aggregated flow of the VCCs switched into a VPC must not violate the traffic description of the VPC.

Clearly, there is kind of a dilemma: Should we reserve resources immediately for a new VPC end point, meaning that the CAC checks whether there is resources or not for the new VPC, or should we just accept the new VPC end point and not reserve any resources until a new VCC request arrives for it? And if we want to reserve some resources for a terminated VPC, how should it be done?

First of all, one needs to understand that the bandwidth of the outgoing link is actually the sole possible resource to be reserved for a VPC end point. This stems from the fact that the buffer need depends on the nature of VCCs to be switched inside the VPC and the fact that VCCs may traverse through different queues and internal interfaces inside a switch depending on the incoming link and the VPC.

Suppose we have somehow allocated bandwidth for terminated VPCs. Then, if a new VCC does not cause VPC traffic descriptor violation, it will be accepted with a great probability. Only the internal bottlenecks of the switch can restrict the access. One drawback of advance allocation is the overall utilization of the switch may stay at a very low level since the request for creation of new VPC end points or increase of the allocation for an old one could be rejected although there would be a plenty of real bandwidth for new traffic on the outgoing link. Note that advance resource allocation for VPCs must be done with some preventive CAC method that may provide either statistical or deterministic QoS guarantee.

In the case where no advance allocation for VPC end points have been made, it is possible to achieve high utilization of the switch. However, a drawback with this option is that some VCCs may be rejected although the target VPC would be half-empty, resulting low utilization in the next VP cross connecting switch unless that switch is using MBAC. On the other hand, it may be even dangerous to apply MBAC in a switch performing mostly VPC cross connections, because the connection holding times with VPCs may be very long and so the switch recovers very slowly from an overload situation caused by sudden increase in traffic of ongoing VPCs.

Neither no-allocation nor pre-allocation strategy provides optimal network utilization. For a network having a lot of long VP connections traversing through numerous switches, the high utilization of VPCs is the key to high overall network utilization, supposing the backbone switches use a preventive, parameter-based VPC admission control. In such an environment, some hybrid of the two alternatives in the border switches, like an automatic renegotiation of traffic parameters of VPCs according to changes of load or a partial advance allocation of resources for terminated VPCs could provide the best result.

A first step and still adequate solution is to perform the following admission check for new CBR-type VPC end points:

$$\text{capacity of the link} \geq \sum_i PCR_i$$

and the following test for new VBR-type end points:

$$\text{capacity of the link} \geq \sum_i SCR_i.$$

An overallocation of VBR-type end points provides better overall utilization of the switch and because it is very unlikely that all VPC end points are concurrently full, individual VPC end points rarely lose VC connections because of the shortage of physical resources.

Figure 8:
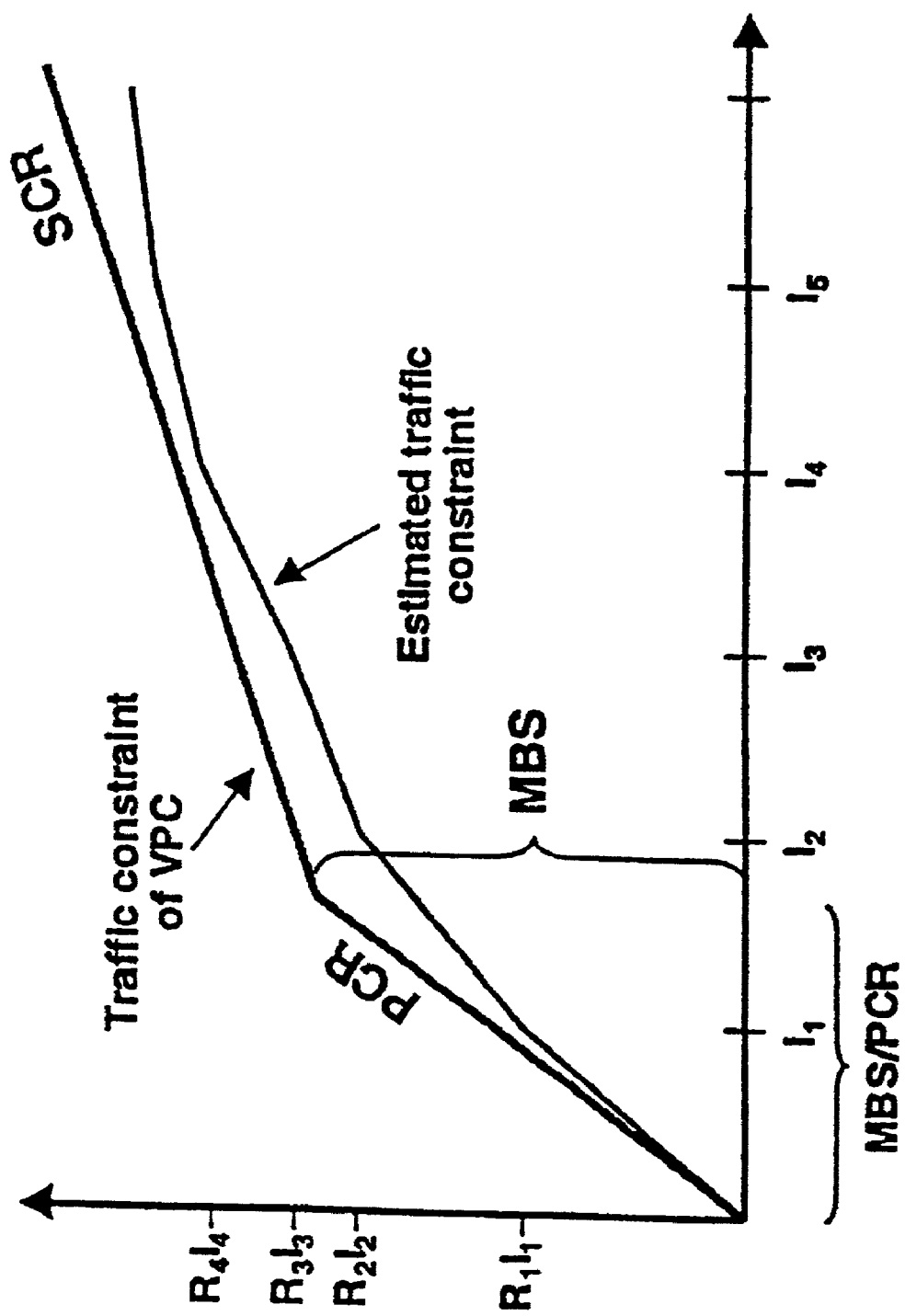
FIG. 8 shows a graph supporting the understanding of the VPC conformance check according to a modification of Qiu's method proposed by the present inventor.

Regardless of VPC admission control method and policy, a VC cross connecting switch must ensure that every terminated VPC conforms to its traffic contract, meaning that the traffic parameters of a VPC are not exceeded due to acceptance of a new VC connection. The conformance can be checked by using estimated maximal rate envelope, as illustrated in FIG. 8, where the estimated traffic constraint should be below the traffic contract-based constraint of VPC for every $I_k$. Note that the estimation requires per VPC measurements, meaning that the transmitted cells per VPC must be counted after buffering. Counting cells before buffering gives obviously inaccurate estimates because buffering reshapes the traffic.

Describing the admission test formally, the following condition must hold for all k=1,2, . . . ,T:

$$R_k + r_k < \frac{1}{I_k}\min(PCR \cdot I_k, MBS + SCR \cdot (I_k - MBS/PCR)),$$

where $R_k = \overline{R}_k + \alpha\sigma_k$, k=1,2, . . . ,T and $r_k$ is the maximal rate envelope of the new connection. In addition, a condition similar to the stability condition of Qiu's original algorithm can be checked as well to get a more reliable decision:

$$\hat{R}_T + r_k + \alpha\hat{\sigma}_T < SCR$$

where $\hat{R}_T$ denotes the average traffic rate over intervals of T.

Although these VPC conformance tests provide high utilization, they may not be applicable in the ATM network performing strict policing. This is due to the inaccuracy of the approximated traffic constraint giving a peak rate that is actually a maximal mean rate over $I_1$. Therefore momentary peak rates may violate the leaky bucket GCRA(PCR, CDVT) used by policing, although the estimated traffic constraint of FIG. 8 does not exceed PCR.

If a very strict conformance to traffic contract is required, then the short delay version of the MBAC introduced earlier or some preventive CAC method must be used, but in most cases it will result in lower utilization. On the other hand, one may question the need for absolutely strict conformance in the case where switches use some preventive CAC method for VPC admission control. Such CAC methods are based on traffic parameters and usually allocate resources assuming that sources send maximal traffic allowed by the traffic contract. In reality, it is unlikely that the every VPC end point on the same link is full of traffic and has non-conforming bursts concurrently. Further, our conformance test restricts the duration of such burst to be less than $I_1$.

Having described the theoretical basis for the method(s) to be implemented, now, according to the present invention, a real implementation of Qiu's MBAC and/or its modification(s) presented before is described.

Throughout the years, one very important design criterion has arisen, both in the area of communications and computer science: scalability. Whatever application area is chosen, it is impossible to know in advance, how large the system will grow.

What problems we meet if we increase the size of an ATM switch, if only CAC is considered? Firstly, the frequency of new connection requests grows. Secondly, when the number of physical and logical links is increased, the amount of measurements, as well as the effort needed to perform all estimations and memory needed to remember both the past data and estimations. If the measurement data is processed in a centralized unit, the amount of measurement data to transfer to and save in the central unit increases. However, the time to make more frequently arriving admission decision must not be affected but remain same. Clearly, when the system size grows, at some point one or more problems listed cannot be solved any more within only one processing unit.

Decentralization of any larger method/device requires dividing the device into independent modules. Especially in real-time systems, the interfaces between modules should be designed to minimize message exchange between modules that are running in separate processing units. Without careful interface design, waiting times increase and the messaging capacity may become as a bottleneck.

According to the present invention, a device operated to carry out an MBAC method, actually should be decentralized in the following modules of estimation functionality module (because estimation is usually quite complex operation, and requires a considerable amount of calculations);

measurement functionality module (because a large switch may have a huge amount of interfaces and even more separate measurement points all over the switch).

Further, measurement functionality presumably needs the support of switching hardware in cell (an ATM cell constituting a data packet in a packet data network) counting. In order to access counters or counting means at least part of the measurement module must be provided locally at each independent switching unit of a switch device or interface unit.

If a so-called MBAC device is divided into three independent modules of admission decision, estimation and measurements, then we have some chances to get on with a large switching system.

Measurement processes can be distributed to every switching unit of a switch device. Estimation processes need to collaborate intimately with measurement processes, so they follow measurement processes everywhere. That is, to each of a plurality of measurement modules there is associated a corresponding one of a plurality of estimation modules. Note that in a minimum configuration, at least one of each modules is provided for.

An admission decision modules controls the device, and asks the estimation processes to report current state of links in order to make admission decisions. If admission decision operation is simple enough, there may not be a need for distributing admission decision functionality at all.

Figure 9:
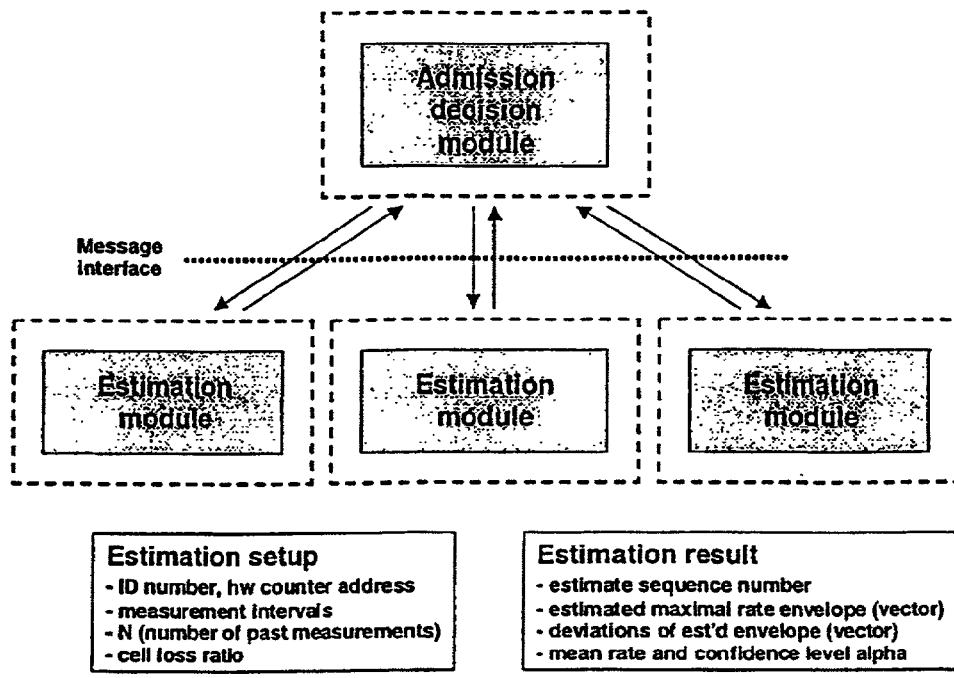
FIG. 9 shows an interface between admission decision and estimation modules, including message contents, according to the present invention.

FIG. 9 illustrates the proposed concept in a block circuit diagram of an interface between admission and estimation modules, including message contents. The MBAC device comprises a (centralized) admission decision module which communicates via a message interface with a plurality of (with at least one in a minimum configuration) estimation modules. In an estimation setup process, the admission decision module informs the estimation modules (via an estimation interface forming part of the message interface), of an ID number, the addresses of the counters to be accessed and/or read, the measurement intervals, a number N of past measurements, a cell loss ratio or the like. In turn, whenever admission decision module asks any particular estimation module to report estimates, the particular estimation module returns to the admission control module information concerning an estimated sequence number, an estimated maximal rate envelope, deviations of said envelope, and statistical quantities such as a mean rate and confidence level alpha. To each estimation module there is associated a measurement module (not shown in FIG. 9) explained later.

A respective measurement/estimation module may be provided for a respective switch unit, i.e. may be provide per virtual channel VC connection and/or per virtual path VP connection and/or per any internal transport interface in an ATM switch, for example (cf. FIG. 7).

In the following section, an implementation of an MBAC (here Qiu's MBAC) is described according to these principles and the solution according to the present invention is introduced module by module.

Figure 10:
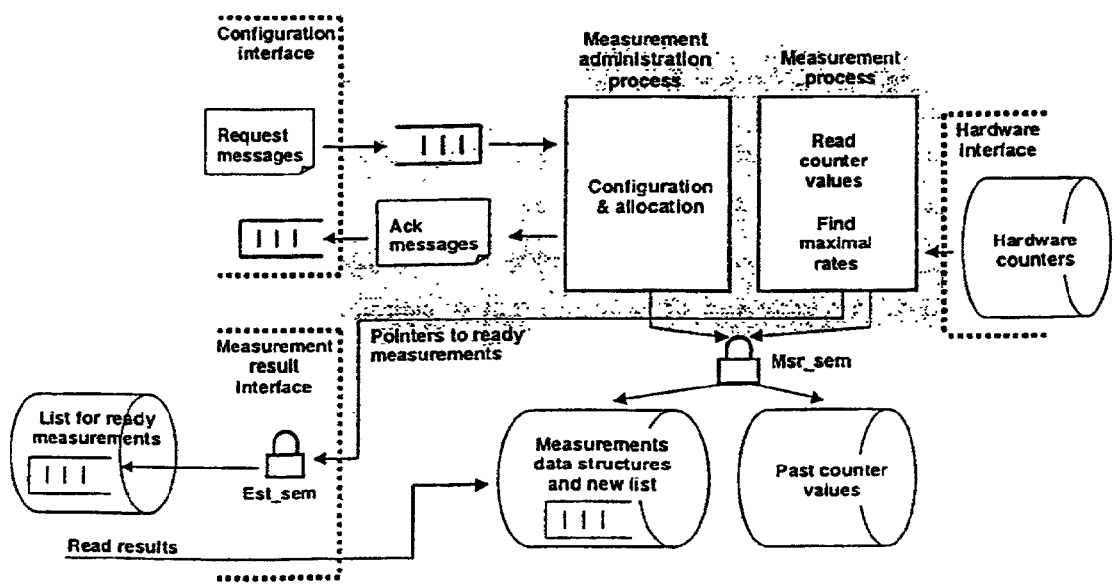
FIG. 10 shows a more detailed block diagram of the architecture of the measurement module according to the present invention.

Measurement Module (FIG. 10)

The measurement of maximal rate envelope is a much more demanding operation than just measuring an average rate over a single interval. Either hardware or software becomes complicated.

Hardware Support

Let us consider what kind of measurement services switching hardware may provide for measuring the maximal rate envelope of (Qiu's) MBAC. Basically, two kinds of solutions are quite obvious:

a) Very specific hardware measures maximal rate envelope on its own. Measurement intervals should be configurable, for example, by using a vector of size T including $I_k$'s, k=1 . . . T.

b) Hardware offers only cell counters. Counters are read either from some register visible in memory address space or the counting hardware writes results directly to a configurable memory area using DMA (Direct Memory Access).

Remember that in both cases the hardware needs to offer means for setting up arrival measurements of any interface or queue and departure measurements of any VPC end point. In the case b), interrupts are likely to be needed to wake up (trigger) the measurement whenever the shortest measurement interval, denoted by τ, has expired and the counter is therefore ready for reading.

After a short reasoning it should be quite clear that the option a) is far too complicated and too bound to a single algorithm to be implemented in hardware. The option b) is much easier to implement and it provides a generic measurement facility to any measurement-based algorithm, so this option is chosen to be the base of our implementation.

Requirements for Measurements

First of all, we define some general level performance requirements:

a) Ongoing measurement must not be disturbed by configuration operations.

b) Hardware counters must be read very soon after interrupt to get right values.

The measurement module provides its services to estimation and so the estimation operations define some requirements for measurement module. These requirements stem from the fact that measurement parameters have no definitely ideal values.

c) The length of measurement intervals $I_k$ cannot be constant. Instead, estimation and admission control must have freedom to choose an appropriate set of intervals $I_k$ and announce them to measurement module for example in a vector I.

d) The number of measurement intervals, T, is not constant.

e) The shortest interval $I_1$ is not constant. For example, it may be a multiple of τ which is the shortest possible measurement interval.

f) The vector I, and the parameters r and $I_1$ might be changed at any time because of measurement optimization performed by admission decision.

Implementation

In order to fulfill performance requirement a) we further divided the measurement module into two separate processes:

1. measurement process and
2. measurement administration process.

In this way, measurement process can be given some real-time priority provided by underlying operating system, which guarantees non-interrupted and immediate reading of counters. Administration process can handle creations, modifications and deletions of measurements with lower priority, because a delay of few milliseconds is not crucial for those operations. To fulfill the requirement b) all the counter values are always written into a temporary variable of each measurement before calculations of maximal rates.

The whole architecture of measurement module is illustrated in FIG. 10. From outside the module have three different interfaces:

Configuration interface: Creations, modifications and deletions of measurements are requested through configuration interface by using message queues. Message queues were chosen because they provide simple interprocess communication without synchronizing problems. (Note that the configuration interface of the measurement module (at least partly) corresponds to measurement configuration interface of the estimation module to be described later.)

Measurement interface: The client of measurement module, estimation process, needs maximal rate envelopes frequently and therefore a considerable amount of data must be exchanged between estimation and measurement processes. With message queues a lot of processing would be needed due to double copying. In addition, message buffers could fill up causing either blocking of the measurement process or loss of measurement data. To avoid these problems, the estimation process is allowed to read directly measurement structures from a shared memory segment. After updating all maximal rate envelopes, the pointers of ready measurement structures are put into a fast FIFO queue ("list for ready measurements" in FIG. 10, corresponding to "ready queue" in FIG. 12) residing in another shared memory segment and the estimate process is signaled to wake it up, to subsequently read the result, i.e. the ready measured maximal rate envelopes denoted by the pointers.

Hardware interface: Hardware interface is actually as clear as possible. Measurement process attaches shared memory segment of hardware counters to its address space in order to read counters. Each measurement request includes the address of hardware counter to read. (Note that a respective counter is allocated to a respective switch unit to be measured, as mentioned before.)

In addition to shared memory segment for measurement, there is another shared memory segment for past counter values shared by administration and measurement processes. From this segment a cyclic counter buffer of a fixed size of $(I_{max\_T}+1)$ is reserved for each measurement, where $I_{max\_T}$ is the longest possible length of any interval expressed as a multiple of $I_1$. The buffers are initialized to their maximum length, because the size of shared memory segments has to be fixed in most systems. The counter buffer is needed in order to calculate the most recent, i.e. current rate $r_k$ over interval $I_k$ (for every k=1,2, . . . T) after every $I_1 \cdot r$ seconds when a new counter value is read. Then, each maximal rate $R_k$ is updated only if $r_k > R_k$.

A functionality called update_msr (not shown) is responsible for calculating maximal rate envelopes. It uses the more accurate definition of maximal rate envelope where only the ends of sliding intervals are restricted to reside inside the measurement window. This method is equivalent to the one represented in the equation on page 22 herein above where interval must only begin inside measurement window.

The problem in implementation of this feature is the fact that under heavy load, it may take a while before estimation process has read a ready measurement and therefore the recent rates, $r_k$'s, expire. The solution was a ready flag in measurement structure: the update of $r_k$'s is not interrupted when the maximal rate envelope becomes ready—only the comparison whether $r_k > R_k$ and the update of $R_k$'s is stalled until the estimation process clears ready flag.

The shared measurement structures provide a fast way to provide access for several processes to the same structures. However, with the use of shared memory a synchronization problem arises and one usually ends up using semaphores (as a kind of arbiters) as presented in literature to guarantee mutual exclusion.

In connection with the solution according to the present invention, two semaphores are needed. A semaphore called msr_sem is used among administration and measurement process. Whenever measurement process starts updating measurement structures, it locks msr_sem. Before releasing of the semaphore, measurement process checks the new list and link new measurements to its update job list.

Correspondingly, whenever the administration process needs to modify or delete measurement structures, or add a new one to the new list, it locks the semaphore. Modify and remove flags are used in measurement structure to indicate ongoing operations so that the administration process needs to hold the semaphore locked only for very short time to avoid delays of the measurement process. Note that the counter value reading cannot be delayed by the semaphore, because the counters are read by a functionality called read counters (not shown) before locking the msr_sem.

Performance requirements are fulfilled, but how about the requirements from c) to f)? Individual set of interval lengths for every measurement is possible, because the measurement request messages bring an interval vector I to the administration process which then copies the vector to the measurement structure for the measurement process. The number of measurement intervals, T, is transmitted and stored as well. However, arbitrary T is not possible, because data structure definitions need a maximum value of T, called max_T. The value of shortest interval need not to be $\tau$, because the unit of interval lengths represented in vector I is $I_1 \cdot \tau$, where $I_1$ is the first element of I.

Finally, all the variables mentioned here can be modified with a request message, so the requirements are fulfilled.

As a whole, with the measurement module the priorisation of counter read operation is achieved and frequent transfers of large amount of data between processes are enabled without overloading the entire device.

Figure 11:
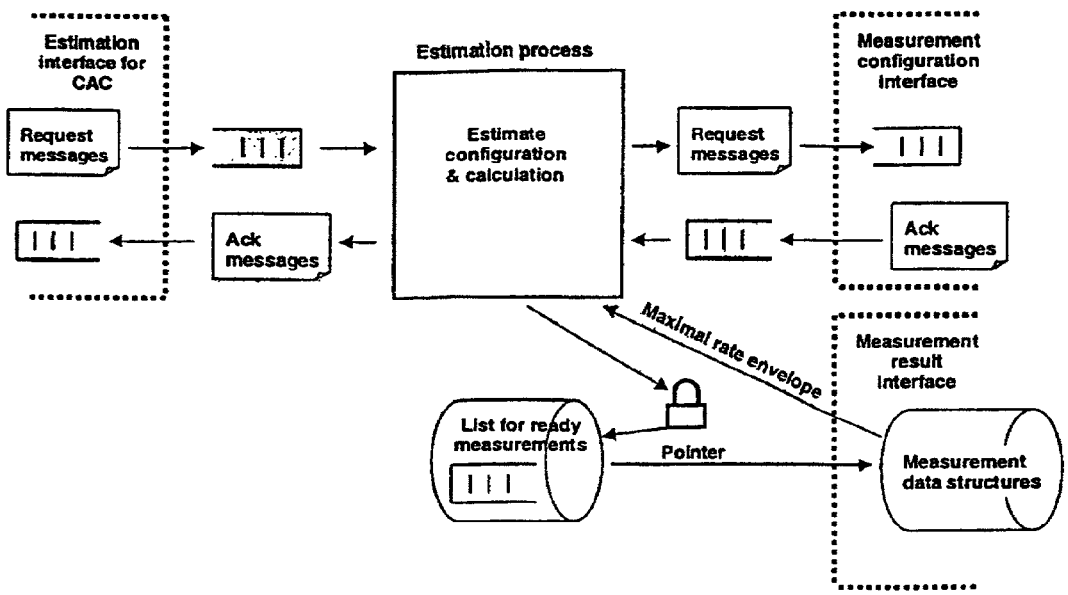
FIG. 11 shows a more detailed block diagram of the architecture of the estimation module according to the present invention.

Estimation Module (FIG. 11)

The job of estimation module is to offer an estimated maximal rate envelope by calculating means and deviations of rates $R_k$ in the past N envelopes and also calculate the confidence level $\alpha$ that reflects the targeted cell loss ratio in the estimate.

Requirements

For estimation module, following performance requirements were defined:

a) Together with the measurement module, estimation module must provide a stable estimation entity which performance does not collapse even when there is a shortage of processing power.

b) Estimation process must avoid unnecessary estimate calculations.

c) Estimation module must be distributable together with measurement module.

d) The estimation module provides estimation services to its client who is either admission control or some other functionality. The clients have their requirements:

d) Configuration and estimation result requests must be communicated through the same simple interface.

e) Client must have a freedom to choose individual estimation parameters for each estimate.

f) A unique ID given by the client identifies each estimate.

Implementation

The estimation module was implemented as a single process for simplicity, although same kind of two process implementation as with measurement module would have been possible.

Main characteristics of the architecture of estimation module are presented in FIG. 11.

The interfaces towards measurement module (measurement configuration and measurement result interfaces) are naturally bound to the implementation of measurement module. In order to fulfill requirements from c) to f) the interface towards admission control (estimation interface for CAC) was implemented with message queues, as the message queues is practically the only simple way to effectively distribute processes. Both configuration and estimate result requests and acknowledgments are carried through the same two queues with two different kinds of messages: est_msg for configuration and est_result_msg for result requests.

The configuration request (in estimation setup, cf. also FIG. 9) includes all necessary parameters: ID, the number of intervals (T), the unit of intervals ($I_1$), the number of past maximal rate envelopes used for estimate (N), cell loss ratio (CLR) and the position of hardware counter from the beginning of hardware counter segment. The estimation process module retains this information in an estimation structure memory (not shown) and forwards the information needed by measurement module to perform the measurements.

Estimation results are requested like configuration requests with an est_msg message. In this case, the only meaningful field is the ID field. The estimation process replies with an est_result_request message including the number of intervals (a field T), the estimated mean rate (a field R_T), the estimated maximal rate envelope (a vector R), the deviations of maximal rates (a vector D), the confidence level (a field alpha) and the sequence number of the estimate (a field seqnum).

On the basis of the sequence number, admission control module is able to determine whether the estimate has been updated since last request or not. Actually the sequence number indicates the sequence number of last measurement used for estimation and also the estimation process uses it to determine whether it needs to calculate a new estimate for the result request or not, so this feature fulfills the requirement b).

The stability requirement a) was actually taken into account already in the design of measurement module. The measurement process puts the pointers of ready measurements into a fast FIFO queue (ready queue) residing in separate shared memory segment and sends then a signal to the estimation process. The signal handler of estimation process then gets the pointers of ready measurement one at a time from the queue and copies the maximal rate envelope into the correct estimate structure. The desired stable behavior is achieved by marking each measurement structure ready for measurements after its maximal rate envelope is copied. Under very heavy load the estimation process does not have enough time to process ready measurements as frequently as they become ready, so the ready queue becomes longer. However, the longer the ready queue is, the fewer measurements are active and the lower is the frequency at which the ready queue gets new items.

In practice, the queue length tend to oscillate a little, but its still better than a total collapse of performance. With this solution, the only consequence of the system overload is the use of a bit older measurements in estimation. We argue this delay is not significant, because the estimates always have quite old elements. For example, if $I_T$=1 s and N=6, then the oldest elements are at least 6 s old.

The estimate request handling is implemented so that by default, the estimate process is waiting any request message to arrive and whenever a message arrives, it is processed immediately and after that the process sleep again to wait a message. However, when a signal arrives indicating ready measurements, the current operation is interrupted regardless the process is just waiting for requests or processing some request. To prevent the ready measurement processing to monopolize process's execution time when the system is under heavy load, a threshold value of processed measurements is defined. When the threshold value is achieved, the process checks for pending requests. If pending requests exists, new signals and therefore ready measurements are ignored until the first request is processed.

Estimate Calculation

Before coding function for estimate calculation one must resolve the confidence level a from equation (4.3.24), because admission control has no use with maximal rate envelopes and deviations without a which takes the effect of CLR into account. The a can be solved from the upper bound of the equation mentioned in connection with Theorem 2 on page 32 herein above as follows:

$$P_{loss} = \max_{k=1,2,\ldots,T} \frac{\sigma_k \delta_0 e^{-\frac{\alpha-\lambda_0}{\delta_0}}}{\overline{R}_T}$$

$$\Leftrightarrow P_{loss} = \frac{\sigma_{max} \delta_0 e^{-\frac{\alpha-\lambda_0}{\delta_0}}}{\overline{R}_T}$$

$$\Leftrightarrow \alpha = \lambda_0 - \delta_0 \ln\left(\frac{P_{loss} \overline{R}_T}{\sigma_{max} \delta_0}\right)$$

$$\text{where } \begin{cases} \sigma_{max} = \max_{k=1,2,\ldots,T} \sigma_k \\ \delta_0 = \sqrt{6}/\pi \\ \lambda_0 = 0,57772\delta_0 \end{cases}$$

A functionality called "calculate" (not shown) calculates a according to the above equation re solved for α. In addition, the estimated maximal rate envelope is a simple mean of past N envelopes and the deviation envelope is also a simple deviation of past N maximal rate envelopes, so the conditional prediction was not used.

As a whole, the implementation of estimation module provides a stable and fare handling of estimation configuration and result requests and clear interface towards admission control.

Figure 12:
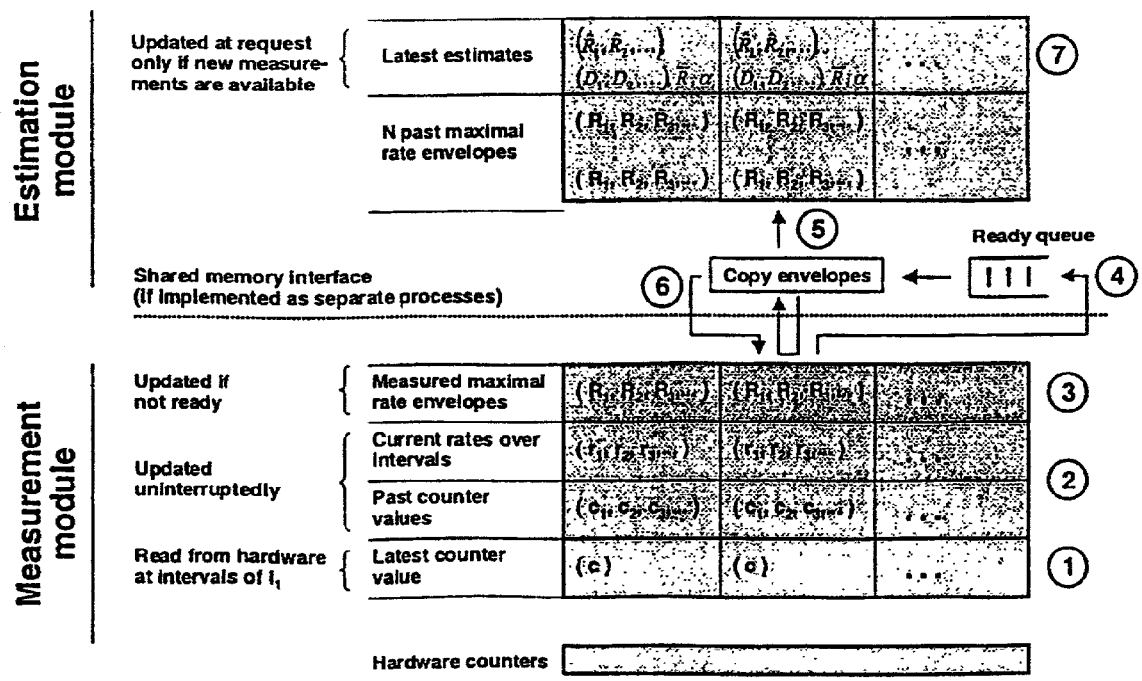
FIG. 12 illustrates an interface between estimation and measurement module and the data exchanged via this interface according to the present invention.

In order to still further clarify the structural composition and functional behavior of the interface between an estimation module and a measurement module, reference is made to FIG. 12 of the drawings. Note that the columns represent the measurement and estimation performed for each of a plurality of counters respectively allocated to a respective switching unit (not shown) of, e.g. an ATM switch device. FIG. 12 illustrates memory areas of measurement and estimation modules and the flow of data there between, as already briefly explained above. The inter-operation there between is as follows:

1. Values from all hardware counters are read into latest count variables at intervals of $I_1$ when the hardware sends interrupt to the measurement module.

2. The latest counter values are copied into the vectors including the past counter values over a period of longest measurement interval $I_T$, at least. In addition, the current rates over intervals $I_1 \ldots I_T$ are updated to the current rate vectors. These operations are executed even if the maximal rate envelope is ready and waiting in the ready queue.

3. The maximal rate envelopes (can be called vectors as well) that are not ready are updated after operation 2. If the current rate(s) is (are) greater than the maximal rate(s) the maximal rate(s) is (are) set to current rate.

4. After a period of $I_T$, the maximal rate envelope becomes ready, a pointer of it is put into the ready queue, and the update of the envelope is interrupted.

5. Estimation module gets pointers of ready envelopes from the ready queue and copies the maximal rates to its structures.

6. The maximal rates of the envelope are zeroed and the envelope is marked as not ready, so the measurement module starts updating the maximal rates again.

7. When the AC module requests an estimate, the estimation module checks whether it has got new maximal rate envelopes since last calculation of the estimate or not. In former case, new estimate is calculated, and in latter case, the old estimate is provided.

Admission Decision Module

For admission control module the following kind of architecture is provided.

CAC algorithms

Herein above, it was illustrated how much hardware architecture has effect on the method. We continue our previous assumptions and imagine that the hardware (of the switch device in the packet network) has the priority queue implementation. Therefore admission control for highest priority real-time connections could be based on the modified real-time version of the method (as conceived by the present inventor) and for non-real-time connections the priority queue version could be applied. For VPC end point admission control the sum admission tests of the equations indicated on page 51 and for VPC conformance tests the maximal rate envelope-based conformance test of the equations indicated on page 52, are applied, both introduced in this application.

VP cross connection admission control can be made with same methods as VC cross connection admission control, assuming that a remarkable portion of connections are VCCs with shorter holding times.

All of the three variations of the MBAC we have developed in this work—the real-time version, the priority queue version and the VPC conformance check version—need the improvement for frequent connection request rate we suggested in connection with the introduction of Qiu's method. For example, if $I_T=1$ s, new estimated maximal rate envelopes are available only at 1-second intervals.

The improved operation of each method is quite simple: when the first connection request arrives, according to the method a request for a new estimate from estimation module is issued and the sequence number of estimate is saved. If the connection is accepted, according to the methods, the advertised maximal rate envelope is saved (see first equation on page 30) of the connection into a sum envelope.

If the sequence number of next estimate requested at the time of next connection request is still same, the sum envelope is added to the estimated envelope and the new connection is again added to sum envelope after admission. The sum envelope is zeroed always when a fresh estimate with a new sequence number is received. In this way the algorithms should be conservative enough during a transition state when an empty system is filling up rapidly.

According to the presented architecture the only connection type requiring per connection estimation instance is VPC end point. Therefore we believe that estimation and measurement configurations are not a performance bottleneck.

Data Structures

The real-time method has to save VC connection specific information, PCR at least. Also the PCR, SCR and MBS parameters of every VPC end point have to be saved, because both VPC end point admission control algorithm and VPC conformance check needs these parameters. According to our current knowledge the priority queue method does not need to save per connection information. As a whole, the described measurement-based CAC architecture needs smaller data structures than preventive CAC algorithms which typically save all traffic parameters of every connection.

In the literature a remarkable data structure entity of any CAC architecture is usually forgotten: the switch topology data structure. In order to make admission decisions the CAC must know the switch architecture very well. In our case, the admission control module is responsible for setting up necessary estimation instances. For each estimate instance the admission control have to remember the estimation parameters it has sent to estimation module.

Estimation Parameter Choices

The effect of parameters choices was generally discussed in connection with the introduction of Qiu's MBAC method, so we concentrate here only some details. One detail is the function I(k) and another is the adjustment of the measurement window length $I_T$.

The original version of Qui's MBAC uses linear increase of interval length. If the $I_T$=1 s and $I_1$=10 ms, then the number of intervals is T=100 which may be intolerable large, because the processing requirements of measurement and estimation increase in proposition to T. Further, maximal rates over 990 ms and 1000 ms are not likely to differ a lot. Therefore it is reasonable to use exponential increase of $I_k$.

There is one problem with the exponential increase of $I_k$, anyway. Recall that the priority queue algorithm requires that the increase is linear, because the admission tests of the equations given on top of page 46 does not work with non-linear I. The solution is to use a linear increase of $I_k$ at first, say from 10 ms to 100 ms, if the $I_1$=10 ms, and increase the I exponentially with larger values.

Because the maximal rate decrease near monotonically, we can require that for longer intervals the sum of maximal rate estimate of higher priorities and the current priority do not exceed service rate, without noticeable decrease in utilization.

Conceivable Alternative Implementations:

The above discussed concept was that the implementation is divided into three independent modules, which provides a clear and sound solution with appropriate interfaces.

Optionally, due to the estimation and measurement modules being tightly coupled and the use of shared memory makes the interface between modules not too easy, and both modules alone has no use for other purposes, an alternative solution could reside in a combined module that could be implemented as a single process.

Counter read and measurement calculation operations would have a priority when implemented by using signal handler as already proposed above, because the signal handler function is always finished before continuing execution of a stack just before the signal arrived.

This provides a kind of one way mutual exclusion—therefore modify, remove and ready flags could be set on and of without semaphores. Also message interface between estimation and measurement could be saved. Every time the measurement update function would finish, the execution of ongoing estimation or configuration request would continue. With this solution, the number of operations like message passing, semaphore operations and process switches could be decreased. As a result, the computational complexity would also decrease.

However, controlling overload situation might be more difficult than before, because the control system should guarantee the execution of measurement signal handler function without preemption of the process. On the other hand, the process must be preempted at some time in order to execute other processes. Therefore the preemption of the process should happen after the signal handler function has finished its job. To do this, a real-time operating system with ability to provide minimum uninterrupted execution time and ability to preempt the process after that is needed.

As has been described herein before, the present invention proposes a measurement-based connection admission control device for a packet data network, comprising at least one measurement module adapted to measure packet data traffic in said packet data network and to output corresponding measurement results; at least one estimation module adapted to perform an estimation to obtain an estimated maximal rate envelope of traffic based on said measurement results, and an admission control module adapted to admit a requested new connection in said packet data network based on the estimated maximal rate envelope of traffic.

It should be understood that the above description and accompanying figures are merely intended to illustrate the present invention by way of example only. The preferred embodiments of the present invention may thus vary within the scope of the attached claims.

The invention claimed is:

1. A measurement-based connection admission control device for a packet data network, comprising
    at least one measurement module to measure packet data traffic in said packet data network and to output corresponding measurement results, said measurement module comprises counting means which measure the packet data traffic on a per packet basis by counting data packets;
    at least one estimation module to perform an estimation to obtain an estimated maximal rate envelope of traffic based on said measurement results, and
    an admission control module to admit a requested new connection in said packet data network based on the estimated maximal rate envelope of traffic,
    wherein said measurement result interface further comprises a measurement result ready indicator adapted to be set by said measurement module and to be read by said at least one estimation module, and wherein said at least one estimation module copies results indicated to be ready by said ready indicator from said commonly used memory area for being processed by said estimation module.

2. A device according to claim 1, wherein said ready indicator is set after a longest measurement interval has passed.

3. A device according to claim 1, wherein said at least one estimation module resets a partition of the memory area holding the copied results after the results have been copied.

4. A device according to claim 1, wherein said ready indicator is a queue.

5. A device according to claim 2, wherein said ready indicator is a queue.

6. A measurement-based connection admission control device for a packet data network, comprising
- at least one measurement module to measure packet data traffic in said packet data network and to output corresponding measurement results, said measurement module comprises counting means which measure the packet data traffic on a per packet basis by counting data packets;
- at least one estimation module to perform an estimation to obtain an estimated maximal rate envelope of traffic based on said measurement results, and
- an admission control module to admit a requested new connection in said packet data network based on the estimated maximal rate envelope of traffic, wherein a reading operation from said counting means and an update operation of previously measured results is prioritized, so that stability of the device under processor overload situations is achieved.

7. A device according to claim 6, wherein
- a respective one of said at least one measurement module is associated to a respective one of said at least one estimation module, and
- each of said at least one of said associated measurement and estimation modules is spatially distributed to a corresponding switching unit of a switch device of said packet data network.

8. A device according to claim 6, wherein said measurement and estimation modules respectively associated to each other are coupled via a measurement result interface comprising a commonly used memory area.

9. A device according to claim 7, wherein said measurement and estimation modules respectively associated to each other are coupled via a measurement result interface comprising a commonly used memory area.

10. A device according to claim 6, wherein said admission control module controls a switch device of said packet data network and requests the at least one estimation module to report a current state of connections, and said admission control module takes an admission decision based on said report.

11. A device according to claim 6, wherein said measurement result interface further comprises a measurement result ready indicator set by said measurement module and to be read by said estimation module, and wherein said estimation module copies results indicated to be ready by said ready indicator from said commonly used memory area for being processed by said estimation module.

12. A device according to claim 11, wherein said ready indicator is set after a longest measurement interval has passed.

13. A device according to claim 11, wherein said at least one estimation module resets a partition of the memory area holding the copied results after the results have been copied.

14. A device according to claim 11, wherein said ready indicator is a queue.

* * * * *